United States Patent
Yukimura

(10) Patent No.: US 10,614,653 B2
(45) Date of Patent: Apr. 7, 2020

(54) GAMING MACHINE INCLUDING PROJECTION-TYPE DISPLAY SCREEN

(71) Applicant: Universal Entertainment Corporation, Koto-ku, Tokyo (JP)

(72) Inventor: Tatsunori Yukimura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 183 days.

(21) Appl. No.: 15/649,850

(22) Filed: Jul. 14, 2017

(65) Prior Publication Data

US 2018/0025575 A1    Jan. 25, 2018

(30) Foreign Application Priority Data

Jul. 22, 2016  (JP) .................. 2016-144105
Jul. 22, 2016  (JP) .................. 2016-144106
Jul. 22, 2016  (JP) .................. 2016-144107
Jul. 22, 2016  (JP) .................. 2016-144108
Jul. 22, 2016  (JP) .................. 2016-144109

(51) Int. Cl.
| | |
|---|---|
| G07F 17/32 | (2006.01) |
| A63F 9/24 | (2006.01) |
| H04N 9/31 | (2006.01) |
| G03B 21/10 | (2006.01) |
| G03B 21/56 | (2006.01) |
| G03B 21/606 | (2014.01) |
| G03B 21/62 | (2014.01) |

(52) U.S. Cl.
CPC .......... *G07F 17/3211* (2013.01); *G03B 21/10* (2013.01); *G03B 21/56* (2013.01); *G03B 21/606* (2013.01); *G03B 21/62* (2013.01); *H04N 9/3141* (2013.01); *H04N 9/3185* (2013.01); *H04N 9/3194* (2013.01); *A63F 2009/2461* (2013.01)

(58) Field of Classification Search
CPC ............. G07F 17/3211; G07F 17/3209; A63F 2300/1075; A63F 2300/1087; A63F 2009/2461
See application file for complete search history.

(56) References Cited

U.S. PATENT DOCUMENTS

| | | | | |
|---|---|---|---|---|
| 2002/0198035 | A1* | 12/2002 | Yokota | G07F 17/32 463/16 |
| 2006/0066233 | A1* | 3/2006 | Inoue | G07F 17/3211 313/511 |
| 2009/0093301 | A1* | 4/2009 | Sum | G07F 17/3202 463/31 |

(Continued)

*Primary Examiner* — William H McCulloch, Jr.
*Assistant Examiner* — Ankit B Doshi
(74) *Attorney, Agent, or Firm* — Simpson & Simpson, PLLC; S. Peter Konzel, Esq.

(57) ABSTRACT

There is provided a gaming machine capable of providing diverse type of image representation. The gaming machine 1 includes: a screen unit 10040 whose surface at least partially includes curved portions 10042; and a projector 10020 accommodated inside a casing 2, which is configured to project light to the screen unit 10040. Light projected by the projector 10020 is incident on a back surface side of the screen unit 10040 from the inside of the casing 2. The screen unit 10040 lets the light incident on the back surface side of the screen unit 10040 pass the screen unit 10040, thereby enabling displaying of an image on the front surface side of the screen unit 10040 positioned on the surface of the casing 2.

20 Claims, 16 Drawing Sheets

(56) References Cited

U.S. PATENT DOCUMENTS

| | | | |
|---|---|---|---|
| 2009/0149249 A1* | 6/2009 | Sum | G07F 17/3213 463/30 |
| 2014/0073403 A1* | 3/2014 | dos Santos | G07F 17/3213 463/20 |
| 2017/0262967 A1* | 9/2017 | Russell | G06T 5/006 |

* cited by examiner

FIG.2
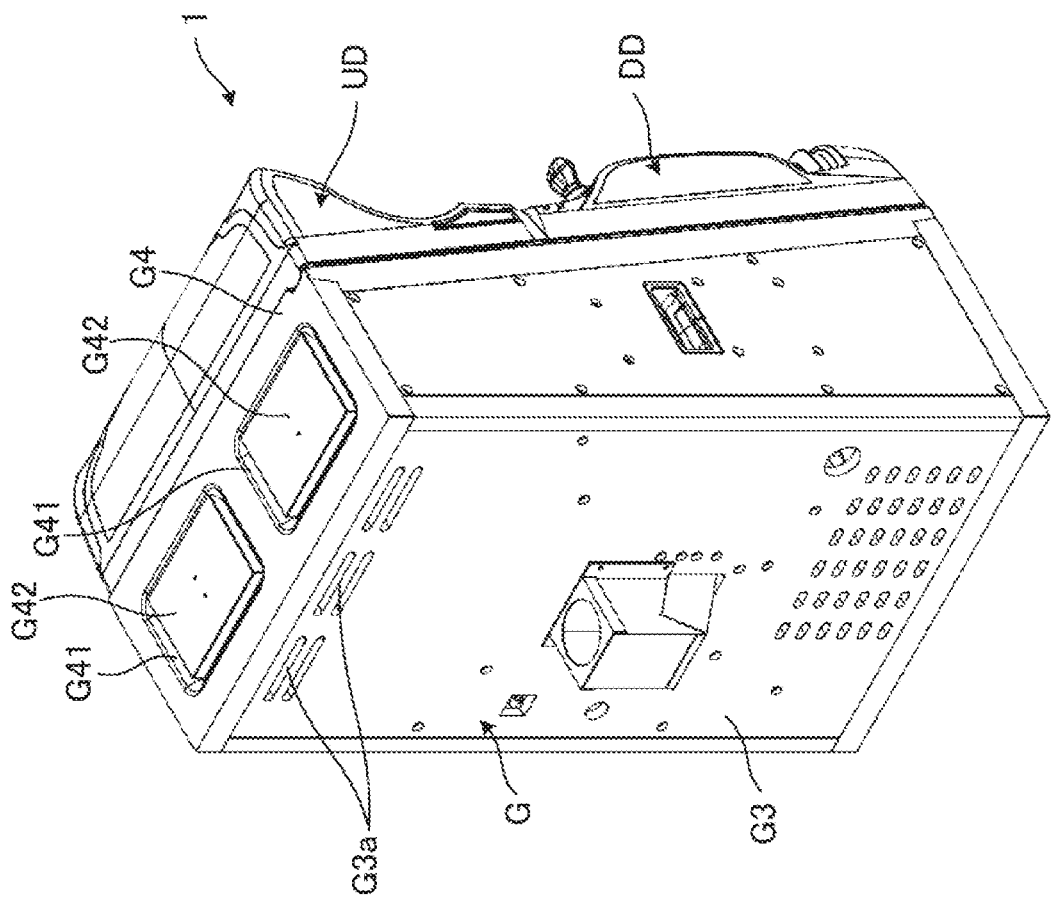
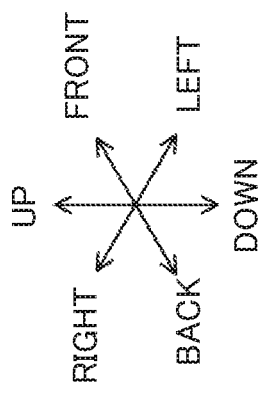

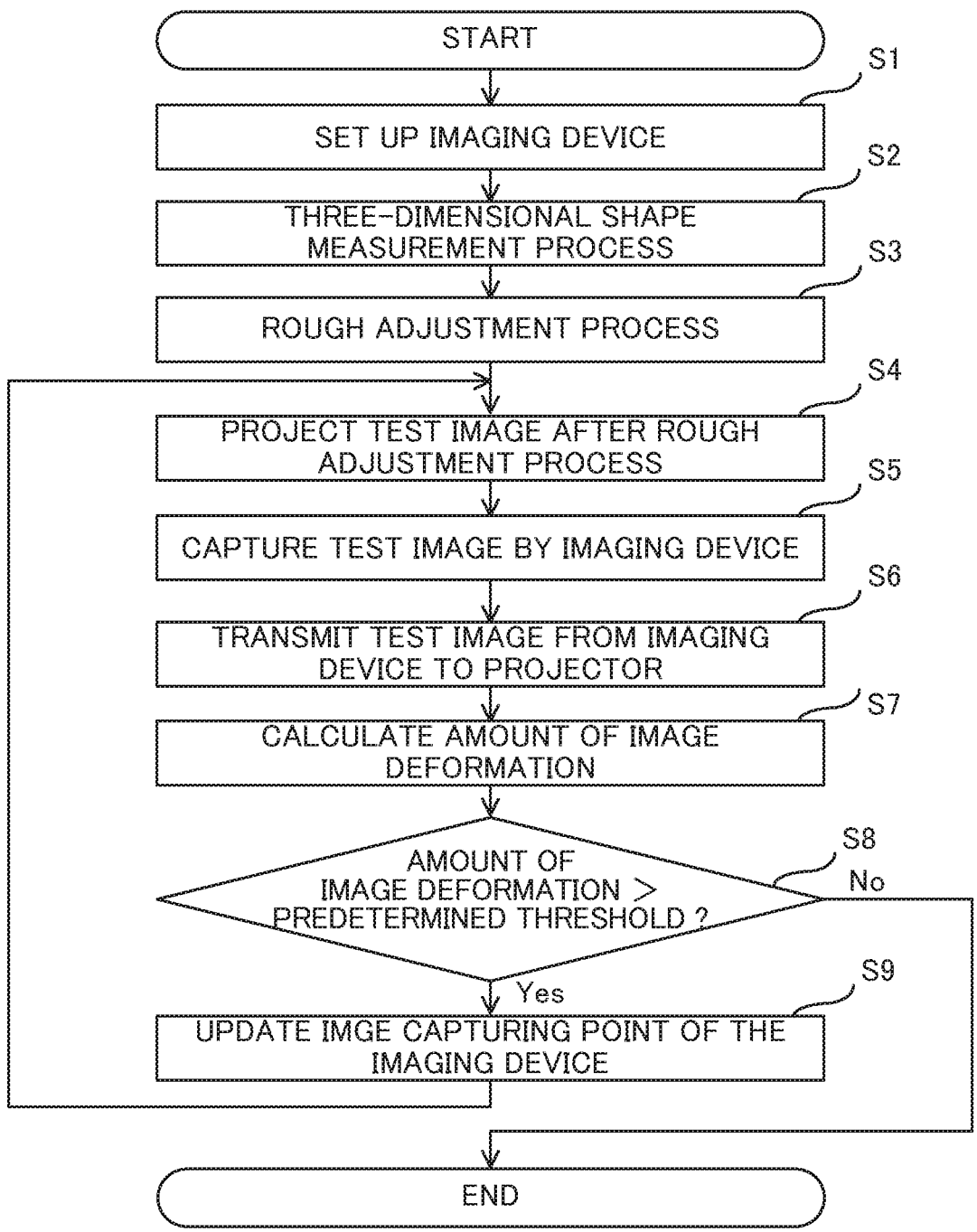

GAMING MACHINE INCLUDING PROJECTION-TYPE DISPLAY SCREEN

CROSS REFERENCE TO RELATED APPLICATION

The present application claims priority from Japanese Patent Applications No. 2016-144105 filed on Jul. 22, 2016, No. 2016-144106 filed on Jul. 22, 2016, No. 2016-144107 filed on Jul. 22, 2016, No. 2016-144108 filed on Jul. 22, 2016, and No. 2016-144109 filed on Jul. 22, 2016, the disclosures of which are herein incorporated by reference in its entirety.

TECHNICAL FIELD

The present invention relates to a gaming machine.

BACKGROUND ART

Traditionally, there has been known a gaming machine configured to perform an effect by images, using a large screen image display device. As such a gaming machine, there is suggested a gaming machine including a decoration panel provided with a display area configured to display identification information of a plurality of reels; and an image display device provided in an upper position of the decoration panel, which is larger than the display area, and is configured to perform image display of information related to games, wherein the decoration panel and the image display device are integrally set on top and bottom to form a front panel (e.g., Patent Literature 1: Japanese Laid-open Patent Publication No. 2005-46374). Such a gaming machine makes the game more interesting, by executing an effect on a large screen.

SUMMARY OF THE INVENTION

Technical Problem

However, when the image display device is a liquid crystal display device, there are problems that the screen is flat, and the effect representation by images is limited. Further, since the liquid crystal display device is provided inside an exterior member of the gaming machine, the size of the screen is restricted by the exterior member or the frame of the liquid crystal display device, consequently restricting the effect representation by images.

Further, the gaming machine of the Patent Literature 1 has a front door on the front surface side of the casing. This front door is provided with a hinge which enables the door to open and close with respect to the casing. This hinge narrows the area for displaying images on the image display device formed on the front door.

Further, when the image display device is a liquid crystal display device, how the images are seen is determined based on the brightness of the liquid crystal display. Even if the color tone of the image displayed is partially changed, that image is still displayed on the same liquid crystal display, and therefore the change is limited and the effect representation by images is restricted.

Further, when the image display device is a liquid crystal display device, the liquid crystal display is flat, and reflection thereon is restrained. Therefore, the liquid crystal display per se has no decorativeness whatsoever, while no images are displayed, and the effect representation is performed only by image displaying, which lacks the surprising characteristics, and the effect representation by images is also limited to those two-dimensional.

Further, when the image display device is a liquid crystal display device, there are problems that the screen is flat, and the effect representation by images is limited. Further, since the liquid crystal display device is provided inside an exterior member of the gaming machine, the effect representation is confined inside the exterior member, which restricts the effect representation by images.

In view of the above problems, the present invention is made and it is an object of the present invention to provide a gaming machine capable of providing diverse types of image representation.

Technical Solution

The present invention provides a gaming machine as follows.

Namely, a gaming machine of the present invention (e.g., gaming machine 1 and the like) comprises:

a screen (e.g., screen unit 10040 and the like) whose surface at least partially includes a curved surface (e.g., curved portion 10042 and the like);

a projector (e.g., projector 10020 and the like) accommodated inside a casing, which is configured to project light to the screen, wherein the light projected by the projector is incident on a back surface side of the screen from the inside of the casing;

the screen lets the light incident on the back surface side of the screen pass to the front surface side of the screen, thereby displaying an image on the front surface side of the screen positioned on the surface of the casing.

This way, an image is displayed on the front surface side of the screen, and there is no need of providing a frame as in the case of the liquid crystal display device. As such the size of the screen does not have to be restricted by the frame. Further, by having the screen extended to the front end of the casing of the gaming machine, it is possible to stretch the screen throughout the front surface of the casing, when viewed from the front surface side. Further, with the screen surface including at least partially a curved surface, the position of an image displayed on the curved surface portion relative to the depth direction is made different from that of an image displayed on the flat surface portion. This enables representation of a three-dimensional image, and enables the image representation such that an image appears to pop out towards the front surface side from the exterior member of the gaming machine. As the result, there is provided a gaming machine capable of providing diverse type of image representation.

The screen preferably includes a light-transmissive plate formed by a light-transmissive material (e.g., light-transmissive plate 10045, and the like); a screen sheet disposed on a back surface side of the light-transmissive plate (e.g., screen sheet 10046, and the like); and an interposing member having a press surface configured to press the screen sheet against the light-transmissive plate (e.g., upper pressing member UD102, and the like). The press surface of the interposing member (e.g., press surface UD102a, and the like) preferably has a curved shape portion (e.g., curved shape portion UD102b, and the like) whose shape matches with the curved surface.

The screen includes the light-transmissive plate, the screen sheet, and the interposing member. The light-transmissive plate is made of a light-transmissive material. The screen sheet is disposed on the back surface side of the light-transmissive plate. The interposing member presses the screen sheet against the light-transmissive plate by the press surface. The press surface of the interposing member has the curved shape portion whose shape matches with the curved portion.

This way the screen sheet is closely attached to the light-transmissive plate at the curved portion, which prevents image displaying on the front surface side of the screen from being disturbed by a gap between the light-transmissive plate and the screen sheet, or by wrinkles and the like formed on the screen sheet.

According to another preferable aspect of the present invention, the gaming machine further includes:
an exterior member whose at least front surface side is opened (e.g., exterior member G);
a front side member (e.g., upper door mechanism UD and the like) having the screen, which is disposed on the front surface side of the exterior member, wherein
the exterior member is provided with a protrusion (e.g., inner surface side protruding member Gb, and the like) protruding from an inner surface, and
the front side member has a hook (e.g., hook UD120, and the like) configured to be hooked on the protrusion.

A gaming machine with such a structure has the exterior member, screen, projector and the front side member. The exterior member has at least its front surface side opened. The screen is disposed on the front surface side of the exterior member. The projector projects light for displaying images on the screen. The front side member is provided with at least the screen, and is deposed on the front surface side of the exterior member. Further, the screen is capable of displaying image on the front surface side, by light projected from the projector incident on the back surface side of the screen. The exterior member is provided with the protrusion protruding from the inner surface. Further, the front side member has the hook configured to be hooked on the protrusion.

Thus, the front side member provided with the screen capable of displaying images is disposed on the front surface side of the exterior member by hooking the hook to the protrusion of the exterior member. This way there is no need for providing a hinge for jointing the front side member to the exterior member, which enables the range for displaying images broader by the amount of hinge. As the result, in terms of ensuring a broader range for displaying an image, there is provided a gaming machine capable of providing diverse type of image representation.

In addition to the above structure, the gaming machine of the present invention further includes:
a lower front side member (e.g., lower door mechanism DD, and the like) provided below the front side member, wherein
the hook is provided in an upper portion side of the front side member, and
the front side member is fixed to the exterior member, by having its lower portion pressed to the back surface side by the lower front side member.

This way, the front side member provided with the screen capable of displaying images has its upper portion side fixed to the exterior member by hooking the hook on the protrusion of the exterior member, while its lower portion side is fixed to the exterior member by pressing the lower portion side to the back surface side of the lower front side member. Therefore, even without a provision of a hinge, the front side member provided with the screen is stably fixed to the exterior member, while making the range for displaying images broader.

Further, the gaming machine of the above aspect of the present invention further includes:
a structure object (e.g., first structure body 10051, and the like) having a light-transmissive material formed in a three-dimensional shape, the structure object disposed in a position close to the screen, wherein
the screen (e.g., screen unit 10040, and the like) has a structure in which an image displaying part (e.g., screen sheet 10046, and the like) is arranged on a light-transmissive plate (e.g., light-transmissive plate 10045, and the like) made of a light-transmissive plate material, and
the structure object preferably has a light diffusion member (e.g., prism sheet 10056, and the like) on the back surface side.

The gaming machine having such a structure includes the screen, the structure object, and the projector. In the screen, the image displaying part is disposed on the light-transmissive plate made of a light-transmissive material. The structure object is made of a light-transmissive material formed in a three-dimensional shape, and is arranged in a position close to the screen. The projector projects light for displaying images on the screen and the structure object. In addition, the structure object is disposed a light diffusion member on the back surface side.

With this, when light from the projector is projected to the screen and the structure object having the light diffusion member, the brightness becomes higher for the image displayed on the structure object having the light diffusion member with a higher light condensing effect than that of the image displaying part of the screen. This differentiates the brightness for the image displayed on the screen and the image displayed on the structure object. As the result, there is provided a gaming machine capable of providing diverse type of image representation.

Further, for example, when the center of the light projected from the projector is directed to the screen, the structure object arranged in a position close to the screen will be subjected to a portion of light distanced from the center. The brightness of the light projected from the projector may drop with an increase in the distance from the center. In such a case however, by arranging the light diffusion member whose light condensing effect is higher than that of the image displaying part in the structure object disposed in a position where the brightness is lower, it is possible to display images with the brightness restrained from decreasing, even in a position distanced from the center of the light projected from the projector.

Further, since the screen is provided with the curved portion, representation of three-dimensional images is also possible on the screen, in addition to the structure object formed in a three-dimensional shape. By combining these, it is possible to display images with different brightnesses from one another. As the result, there is provided a gaming machine capable of providing further diverse type of image representation.

Further, the gaming machine of the present invention (e.g., gaming machine 1 and the like) further includes:
a structure object (e.g., third structure body 10053, and the like) having a light-transmissive material formed in a three-dimensional shape, wherein
the projector is a device for projecting light for displaying images on the structure object, and
the above structure object has the image displaying part (e.g., screen sheet 10057, and the like) on the back surface side, and has a half-mirror on the front surface side.

The gaming machine having such a structure includes the structure object and the projector. The structure object is made of a light-transmissive material formed in a three-dimensional shape. The projector projects light for displaying images on the structure object. The structure object has the image displaying part on its back surface side and has a half-mirror on its front surface side.

Thus, the structure object in which the half-mirror is formed in a three-dimensional shape reflects the surrounding scene on the three-dimensional shape, while no light is projected from the projector, and displays an image when light is projected from the projector. This provides an unpredictable effect such that images are displayed on the structure object in a three-dimensional shape which reflects the surrounding scene. As the result, there is provided a gaming machine capable of providing diverse type of image representation.

Further, the gaming machine of the present invention (e.g., gaming machine 1 and the like) further includes:

an exterior member whose at least front surface side is opened (e.g., exterior member G, and the like), wherein
the screen includes a light-transmissive plate (e.g., light-transmissive plate 10045, and the like) made of a light-transmissive material, and an image displaying part (e.g., screen sheet 10046, and the like) arranged on the light-transmissive plate,
the screen is capable of displaying an image on the front surface side with light projected from the projector and incident on the back surface side of the image displaying part,
the light-transmissive plate is formed closer to the front surface side than the exterior member,
the image displaying part is disposed in a position a predetermined dimension apart from the front end of the exterior member, and
the screen is provided with a gap (e.g., gap S, and the like) of a predetermined width where no image displaying part is disposed between the image displaying part and a front end of the exterior member.

The gaming machine having such a structure includes the exterior member, the screen, and the projector. The exterior member has at least its front surface side opened. The screen is disposed on the front surface side of the exterior member. The projector projects light for displaying images on the screen. The screen has the light-transmissive plate made of a light-transmissive material, and the image displaying part arranged on the light-transmissive plate. Light projected from the projector is incident on the back surface side of the image displaying part, and the incident light enables displaying an image on the front surface side. The light-transmissive plate is formed close to the front surface side than the exterior member. The image displaying part is disposed in a position a predetermined dimension apart from the front end of the exterior member. As described, the screen is provided with a gap of a predetermined width where no image displaying part is disposed, between the image displaying part and the front end of the exterior member.

Thus, the light-transmissive plate of the screen is formed closer to the front surface side than the exterior member, and the image displaying part is arranged on the light-transmissive plate. This enables displaying of three-dimensional images such that the image pops out from the front surface side of the exterior member. The screen, which is for displaying images on its front surface side with light projected from the projector, is provided with a gap of a predetermined width where no image displaying part is disposed, between the image displaying part and the front end of the exterior member. Therefore images are not displayed in this gap. This makes it possible representation of images such that images appear to be floating at a position apart from the front end of the exterior member. As the result, there is provided a gaming machine capable of providing diverse type of image representation.

In addition to the above structure, the gaming machine of the present invention further includes an illumination device (e.g., indirect illumination unit 10060, and the like) disposed along the gap inside the exterior member.

By arranging the illumination device in the gap between the front end of the exterior member and the display area (the area in which the image displaying part is arranged), the edge of images on the front end side of the exterior member is emphasized. This makes it possible further emphasized representation of images such that images appear to be floating at a position apart from the front end of the exterior member. As the result, there is provided a gaming machine capable of providing further diverse type of image representation.

In addition to the above structure, the gaming machine of the present invention further includes an imaging device, wherein
the projector executes a process of projecting a first adjustment test image, and a process of measuring a three-dimensional shape of the screen, wherein
the imaging device executes a process of capturing the first adjustment test image from a first image capturing point which is a second position different from a first position where the projector is installed, thereby obtaining a first adjustment captured image, and
the projector executes a process of image correction to reduce geometrical image deformation at the first image capturing point, based on three-dimensional shape data measured in the process of measuring the three-dimensional shape, and the first adjustment captured image.

This way, the gaming machine is able to perform projection on any given projection target of a three-dimensional shape. The projector executes the process of appropriately correcting geometrical deformation in the projected image. This gaming machine does not require a traditionally executed complex calculation process using a high-performance device for accurately specifying a view point of a user.

Particularly, when the image capturing point at which the first adjustment captured image is captured matches (or substantially matches) with the user view point, geometrical deformation in the projected image is appropriately corrected through a very simple process.

The projector preferably executes a process of performing further image correction to further reduce geometrical image deformation, based on a state of an image projected on the screen, which image has been corrected through the process of correcting image.

This way, the projector is able to suitably correct geometrical deformation in the projected image, through two stages of adjustments: i.e., (1) a first image deformation correction (e.g., rough adjustment process); and (2) second image deformation correction (e.g., precision adjustment process).

Such a gaming machine projects an image (test image) adjusted through the first image deformation correction, and executes the second image deformation correction to eliminate the geometrical deformation in the projected test image. Therefore, even if the user's view point is shifted, there is no need for traditionally performed complexed calculation process using a high performance device for accurately specifying the user's view point.

Advantageous Effects

With the present invention, there is provided a gaming machine capable of providing diverse type of image representation.

BRIEF DESCRIPTION OF THE DRAWINGS

The nature and mode of operation of the present invention will now be more fully described in the following detailed description of the invention taken with the accompanying drawing figures, in which:

FIG. 2 is a perspective view of a gaming machine 1 related to the present embodiment, viewed from the back;

FIG. 9 is a diagram of a view from the back right direction indicated in FIG. 3;

FIG. 16 is a flowchart showing an example correction process of deformation in a projected image from the projector 10020.

DETAILED DESCRIPTION OF EMBODIMENTS

It should be appreciated that, in the detailed description of the invention that follows, like reference numbers on different drawing views are intended to identify identical structural elements of the invention in the respective views.

The following describes an embodiment of the present invention with reference to attached drawings. The gaming machine is one that is played with a use of gaming medium such as coins, medals, gaming balls, tokens, and a card storing information of gaming value which is given or to be given to the player. The following however deals with a case of using medals.

In the description below, a side of (direction from) the gaming machine 1 towards a player is referred to as the front side (forward direction) of the gaming machine 1. The side opposite to the front side is referred to as the back side (backward direction, depth direction). The player's left and right sides are referred to as the right side (rightward) and the left side (leftward) of the gaming machine 1, respectively. Further, the directions towards the front side and the back sides are collectively referred to as forward/backward direction or thickness direction. The directions towards the left side and the right sides are collectively referred to as left/right direction or width direction. Further, directions perpendicular to the forward/backward direction (thickness direction) and the left/right direction (width direction) are collectively referred as vertical direction or height direction.

Figure 1:
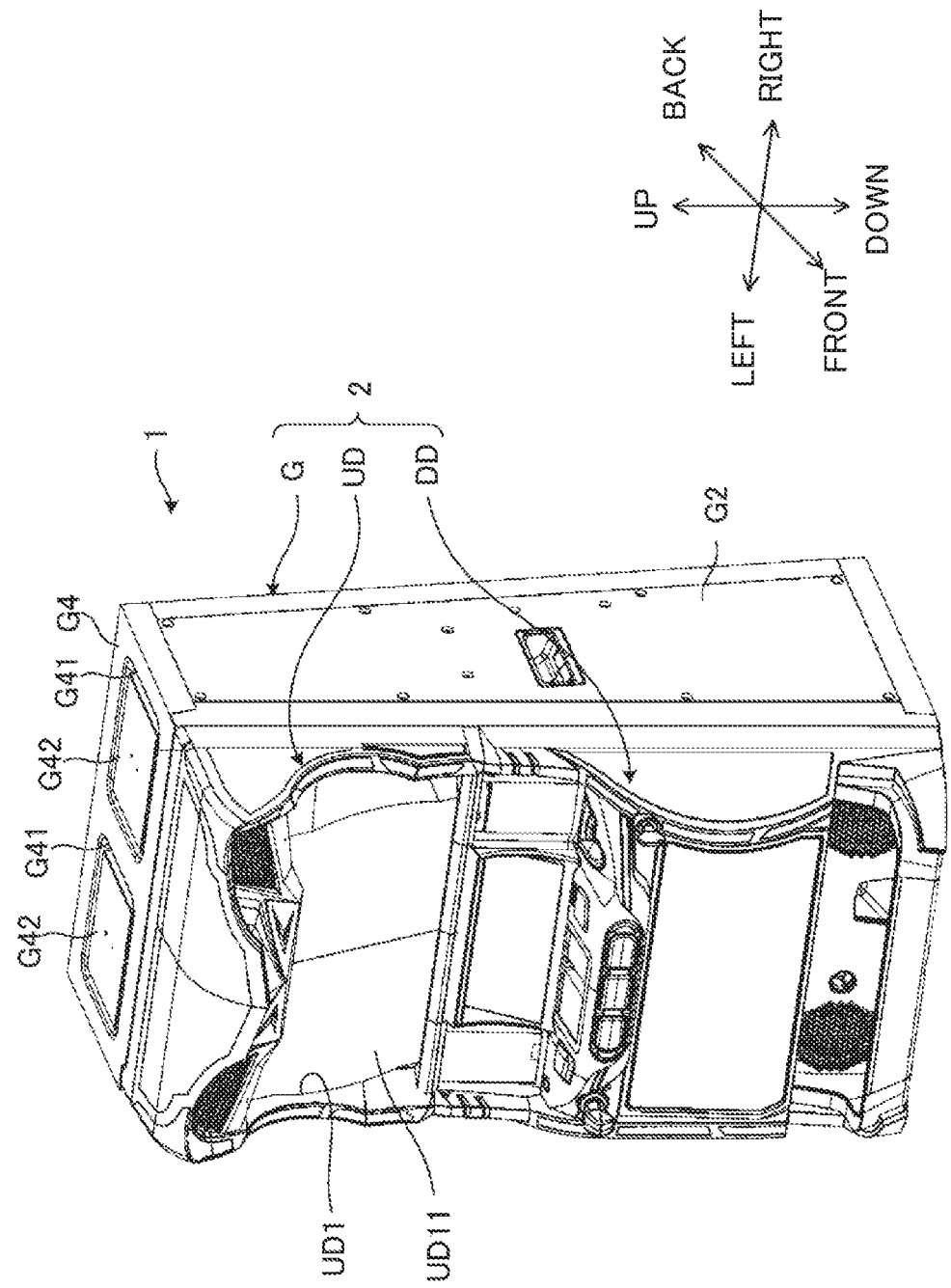
FIG. 1 is a perspective view of a gaming machine 1 related to the present embodiment, viewed from the front.

As shown in FIG. 1 and FIG. 2, the exterior appearance of the gaming machine 1 is structured by a rectangular-box shaped casing 2. The casing 2 has a metal made cabinet G having an opening of a rectangular shape on its front surface side, an upper door mechanism UD disposed in an upper front portion of the cabinet G, and a lower door mechanism DD disposed on a lower front portion of the cabinet G.

The cabinet G includes a side wall G2, a back wall G3, and an upper wall G4, and is structured to accommodate devices used for gaming. The upper door mechanism UD and the lower door mechanism DD are formed so as to correspond to the shape and size of the opening of the cabinet G. The upper door mechanism UD and the lower door mechanism DD are provided in such a manner as to close the upper portion and the lower portion of the opening of the cabinet G. The upper door mechanism UD has an upper display window UD1 in its substantially center portion. The upper display window UD1 is provided with a transparent panel UD11 which transmits light.

On the back wall G3 of the cabinet G is provided a ventilation hole G3a which exhaust, to the outside of the machine, the heat of the projector mechanism along with the air. On the upper wall G4 of the cabinet G are formed two openings G41 which penetrates the wall in the vertical direction, and which are spaced from each other by a predetermined distance relative to the left/right direction. Further, wood-made plate members G42 are attached to the upper wall G4 so as to plug these two openings G41.

Figure 3:
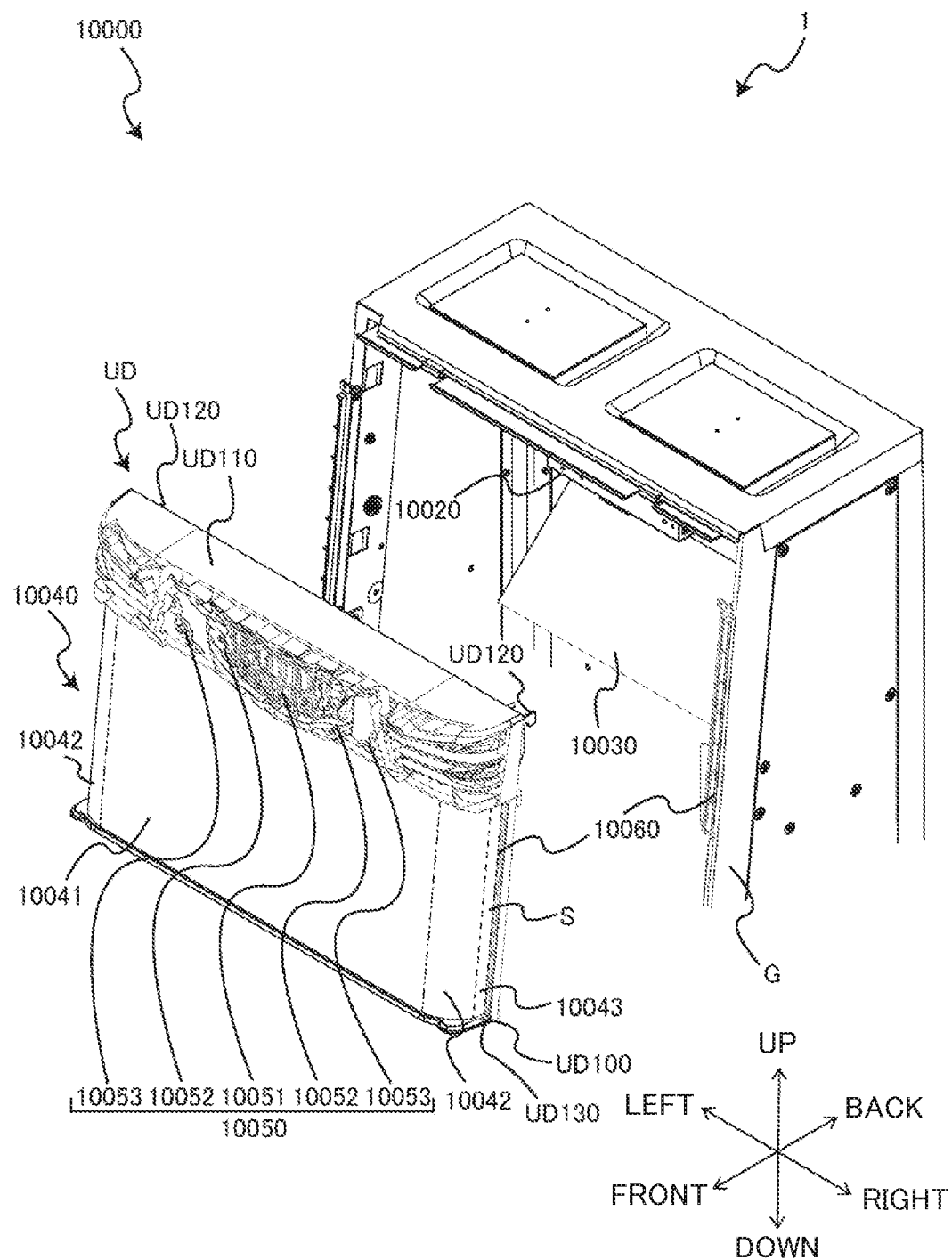
FIG. 3 is a perspective view of an upper portion of the gaming machine 1, and shows a state in which an upper door mechanism UD is detached from a cabinet G.

FIG. 3 is a perspective view of an upper portion of the gaming machine 1, and shows a state in which an upper door mechanism UD is detached from a cabinet G. A display unit 10000 shown in FIG. 3 is attached to the cabinet G and the upper door mechanism UD.

It should be noted that, the present embodiment deals with a case of applying the display unit 10000 to a Pachislo gaming machine, where the cabinet G of the Pachislo gaming machine is an example of the exterior member, and the upper door mechanism UD of the Pachislo gaming machine is an example of the front side member. However, the present invention is not limited to this, and the display unit 10000 may be applicable to a Pachinko gaming machine. In such a case, the display unit may be attached to a wooden flame and the like of the Pachinko gaming machine as an example of the exterior member and to a glass door and the like of the Pachinko gaming machine as an example of the front side member. Further, the front side member is not limited to the upper door mechanism UD, and may be the lower door mechanism DD, or a door in which the upper and lower part are integrally formed. Further, the front side member or the lower front side member are not limited to a door, and may be any given member such as a frame, panel, and the like, as long as the member covers the front surface side of the exterior member.

Further, the display unit 10000 may be applied to a slot machine. A slot machine is a gaming machine which rotates and then stops a plurality of reels each of which having a plurality of symbols, thereby rearranging a plurality of symbols, every time a player operates a button arranged on a control panel. In such a slot machine, a benefit such as free games and the like is awarded to the player, based on a combination of the plurality of symbols rearranged in a normal game.

For example, when a slot game is started, a normal game symbol random determination process is first executed as the normal game, for randomly determining symbols to be rearranged on the symbol display device. Then, when a combination of the plurality of symbols to be rearranged as the result of the normal game symbol random determination process satisfies a predetermined condition, the a special payout corresponding to the combination of the plurality of symbols having satisfied the predetermined condition is awarded, and a transition process to make a transition to a free game is executed. Next, after transition to the free game, a free game symbol random determination process is executed as the free game, for randomly determining symbols to be rearranged on the symbol display device. Then, if a predetermined symbol is rearranged as the result of free game symbol random determination process, a free game payout awarding process is executed to award a free game payout which is based on the special payout awarded at the time of making the transition to the free game.

<Upper Door Mechanism UD>

The upper door mechanism UD of the present embodiment includes: a lower frame UD100 which supports the outer edge of a later-described screen unit 10040; an upper frame UD110 disposed above the lower frame UD100, which supports the outer edge of a later-described decoration unit 10050; a hook UD120 for locking the upper door mechanism UD to the cabinet G, and a pressing member UD130 for pressing the upper door mechanism UD by the lower door mechanism (not shown).

Figure 4:
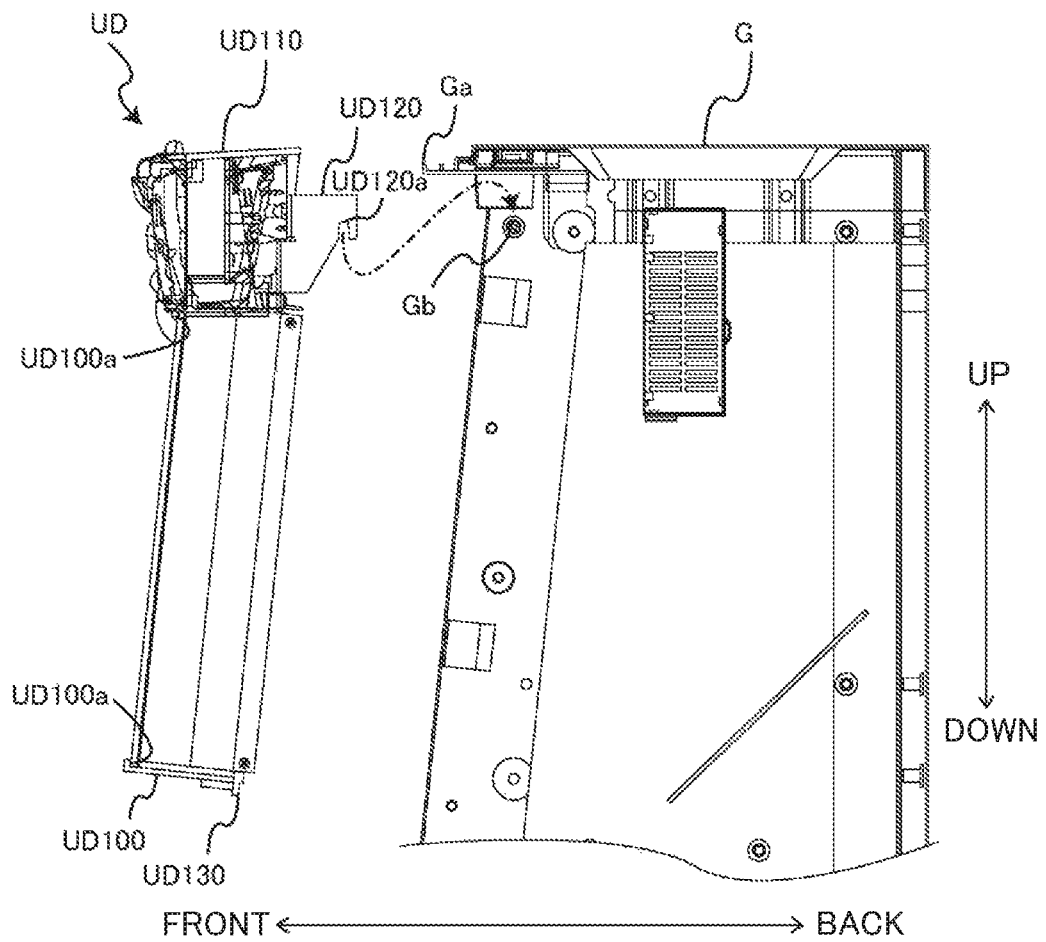
FIG. 4 is a longitudinal cross section view of the upper door mechanism UD and the cabinet G.

FIG. 4 is a longitudinal cross sectional view of the upper door mechanism and the cabinet. The lower frame UD100 is a frame of a substantially quadrangular shape when viewed from the front, and has a screen engagement part UD100*a* which engages with the outer edge of the later-described screen unit 10040. The upper frame UD110 is a frame of a substantially quadrangular shape when viewed from the front, and the later-described decoration unit 10050, a speaker cover (not shown), and the like are attached thereto with a use of a screw and the like. Further, when the upper door mechanism UD is attached to the cabinet G, the upper end member of the upper frame UD110 is placed at the front surface side protrusion Ga protruding towards the front surface side of the cabinet G. This way, the upper door mechanism UD is stably attached to the cabinet G, and even if a foreign material is inserted through the gap between the upper door mechanism UD and the cabinet G, the foreign material is blocked by the front surface side protrusion Ga.

The hook UD120 protrude towards the back surface side (backward shown in FIG. 4) of the upper frame UD110, and has a notch UD120*a* with its lower portion opened. The hook UD120 is such that the notch UD120*a* is hooked on to an inner surface side protruding member Gb (e.g., a screw and the like whose leading end is screwed to the side wall) protruding inward of the cabinet G. The pressing member UD130 protrudes downwards from the under surface of the lower frame UD100.

To attach the upper door mechanism UD to the cabinet G in the above structure, the notch UD120*a* of the hook UD120 of the upper door mechanism UD is hooked on the inner surface side protruding member Gb of the cabinet G, as indicated by the arrow in FIG. 4, and the upper frame UD110 is placed on the front surface side protrusion Ga of the cabinet G. Then, while the pressing member UD130 is pressed by the lower door mechanism, the lower door mechanism (not shown) is closed with respect to the cabinet G. This fixes the upper door mechanism UD is fixed to the cabinet G.

It should be noted that the present embodiment deals with a case where the lower portion of the upper door mechanism UD fixed to the cabinet G by pressing the lower portion of the upper door mechanism UD by the lower door mechanism DD. However, the present invention is not limited to this, and the lower portion of the upper door mechanism UD may be provided with a fixing tool that engages with the cabinet G or a unit provided inside the cabinet G, and the lower portion of the upper door mechanism UD may be fixed to the cabinet G by using this fixing tool.

<Display Unit 10000>

The reference goes back to FIG. 3. The display unit 10000 is an example of gaming device, and includes: a projector 10020 and a mirror 10030 fixed to the cabinet G; a screen unit 10040 and a decoration unit 10050 assembled with the upper door mechanism UD; and an indirect illumination unit 10060.

Although details are provided later, the display unit 10000 displays images as follows. The screen unit 10040 includes a screen sheet 10046 arranged on the back surface side (back side in FIG. 3) of a light-transmissive plate 10045. This way, light projected from the projector 10020 and reflected on the mirror 10030 is incident on the back surface side of the screen sheet 10046 of the screen unit 10040, and image is displayed on the front surface side of the light-transmissive plate 10045 by the light.

On the back surface side of the decoration unit 10050 is arranged a screen sheet 10057 (see FIG. 9 described later) or a prism sheet 10056 (see FIG. 9 described later). This way, light projected from the projector 10020 and reflected on the mirror 10030 is incident on the back surface side of the screen sheet 10057 or the prism sheet 10056, and image is displayed on the front surface side of the decoration unit 10050 by the light. The following details the display unit 10000.

[Mechanical Structure of Projector Mechanism B2 of Projector 10020]

Figure 5:
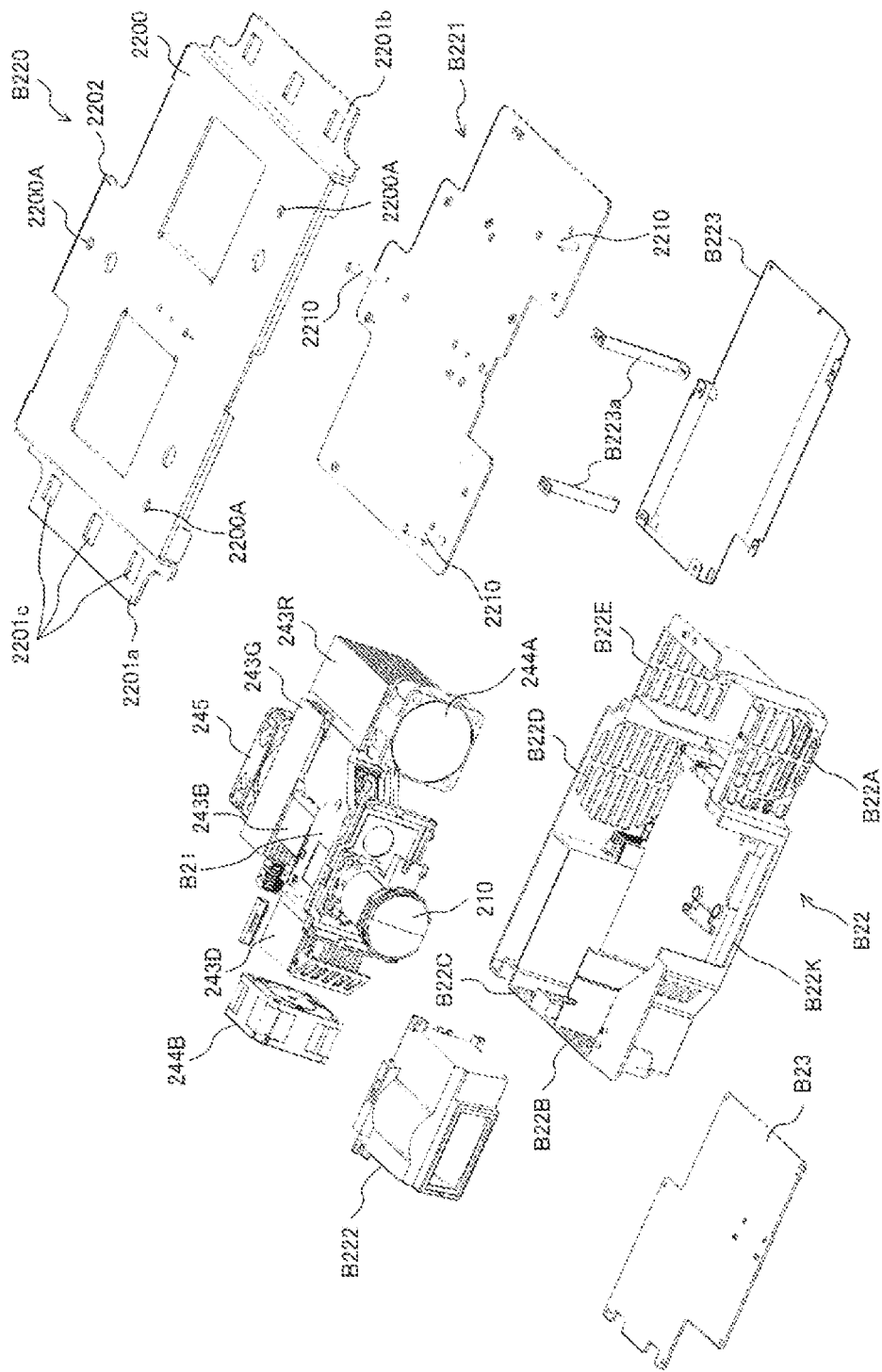
FIG. 5 is an exploded perspective view of a projector mechanism B2.

FIG. 5 is an exploded perspective view of a projector mechanism B2 of the projector 10020. As shown in FIG. 5, the projector mechanism B2 has, as its external structuring elements, a casing B22, a lens unit cover B222, an under cover B223, an upper side base B220, and a lower side base B221. The lens unit cover B222 is attached to a front opening B22*k* of the casing B22. On the under surface of the casing B22 is the under cover B223 in such a manner as to cover the under surface. The under cover B223 is supported by the lower side base B221 through one or more stays B223*a*, and is fixed to suitable portions on the under surface of the casing B22.

The projector mechanism B2 is attached to a projector cover (illustration omitted) through the upper side base B220 and the lower side base B221.

Further, the projector mechanism B2 includes, as its internal structuring elements, a lens unit B21, an LED substrate (not shown) having an LED optical source mounted thereon, a DMD substrate (not shown) having a DMD mounted thereon, a plurality of heat sinks 243R, 243G, 243B, 243D, air suction fans 244A, 244B, an air exhaustion fan 245, and a projector control board B23. In the casing B22, the lens unit B21 is accommodated while covering a projector lens 210 with the lens unit cover B222 of the lens unit B21, and the LED substrate, the DMD substrate, the plurality of heat sinks 243R, 243G, 243B, 243D, the air suction fans 244A and 244B, and the air exhaustion fan 245 are further accommodated. The projector control board B23 is fixed to the under surface of the casing B22.

Such a projector mechanism B2 receives video data related to video of effects and the like, which is transmitted from a sub controller SS (see FIG. 14), and is controlled by the sub controller SS so as to project videos on a screen.

The heat sinks 243R, 243G, 243B partially contact the back surface of the LED substrate. The heat sink 243D partially contacts the back surface of the DMD substrate. In the present embodiment, the sizes of the fin outlines of the heat sinks 243R, 243G, 243B, 243D are such that the heat sink 243R and the heat sink 243G are relatively large, whereas the heat sink 243B and the 243D are relatively small. These heat sinks 243R, 243G, 243B, 243D dissipate heat generated in the LED substrate and the DMD substrate in the air for efficient heat radiation, to prevent the temperatures of optical elements and substrate from increasing to the extent their optical characteristics are significantly varied. The heat sinks 243R, 243G, 243B, 243D serving as the heat radiating members are each made of an aluminum material with high heat-conductivity for efficient heat radiation, and include a plurality of radiation fins to increase the areas exposed to the air.

The air suction fan 244A is disposed close to the back surface of the right side front portion of the casing B22, and is close to the heat sink 243R. The air suction fan 244B is disposed close to the back surface of the left side portion of the casing B22, and is close to the heat sink 243D. The air exhaustion fan 245B is disposed close to the back surface of the rear portion of the casing B22, and is close to the heat sink 243G.

In the right side front portion of the casing B22 close to the air suction fan 244A, the air intake port B22A is provided. In the right side rear portion of the casing B22, which faces the air intake port B22A and which is close to the heat sink 243R, an air exhaustion port B22E is provided. In a part of the left side portion of the casing B22 close to the air suction fan 244B, an air intake port B22B is provided, and in another part of this left side portion of the casing B22, an air intake port B22C is provided side by side to the air intake port B22B in such a manner that the air reaches the three heat sinks 243G, 243B, 243D, through vacant spaces in the casing B22B. In a rear portion of the casing B22 close to the air exhaustion fan 245, an air exhaustion port B22D is provided.

Thus, in the casing B22 of the projector mechanism B2, there is formed an air flow such that air forcedly taken in through the air intake port B22A by the air suction fan 244A is exhausted from the air exhaustion port B22E while taking away the heat from the heat sink 243R. Further, in the casing B22, there is formed an air flow such that air forcedly taken in through the air intake port B22B by the air suction fan 244B is forcedly exhausted from the air exhaustion port B22D by the air exhaustion fan 245, while taking away the heat from the heat sink 243D, the heat sink 243B, and the heat sink 243G. Yet further, in the casing B22, there is formed an air flow such that air forcedly taken in through the air intake port B22C is forcedly exhausted from the air exhaustion port B22D by the air exhaustion fan 245, while taking away the heat mainly from the heat sink 243G and the heat sink 243B.

The projector control board B23 is attached to the under surface of the casing B22 and is covered by the under cover B223. On the projector control board B23 are mounted a control LSI 230, an EEPROM 231, a DLP control circuit 232, an LED driver 233, and the like. The projector control board B23 is electrically connected to the LED substrate, DMD substrate, and a focus mechanism arranged in the casing B22.

[Mechanical Structure of Mirror Mechanism B3 Provided to Mirror 10030]

Figure 6:
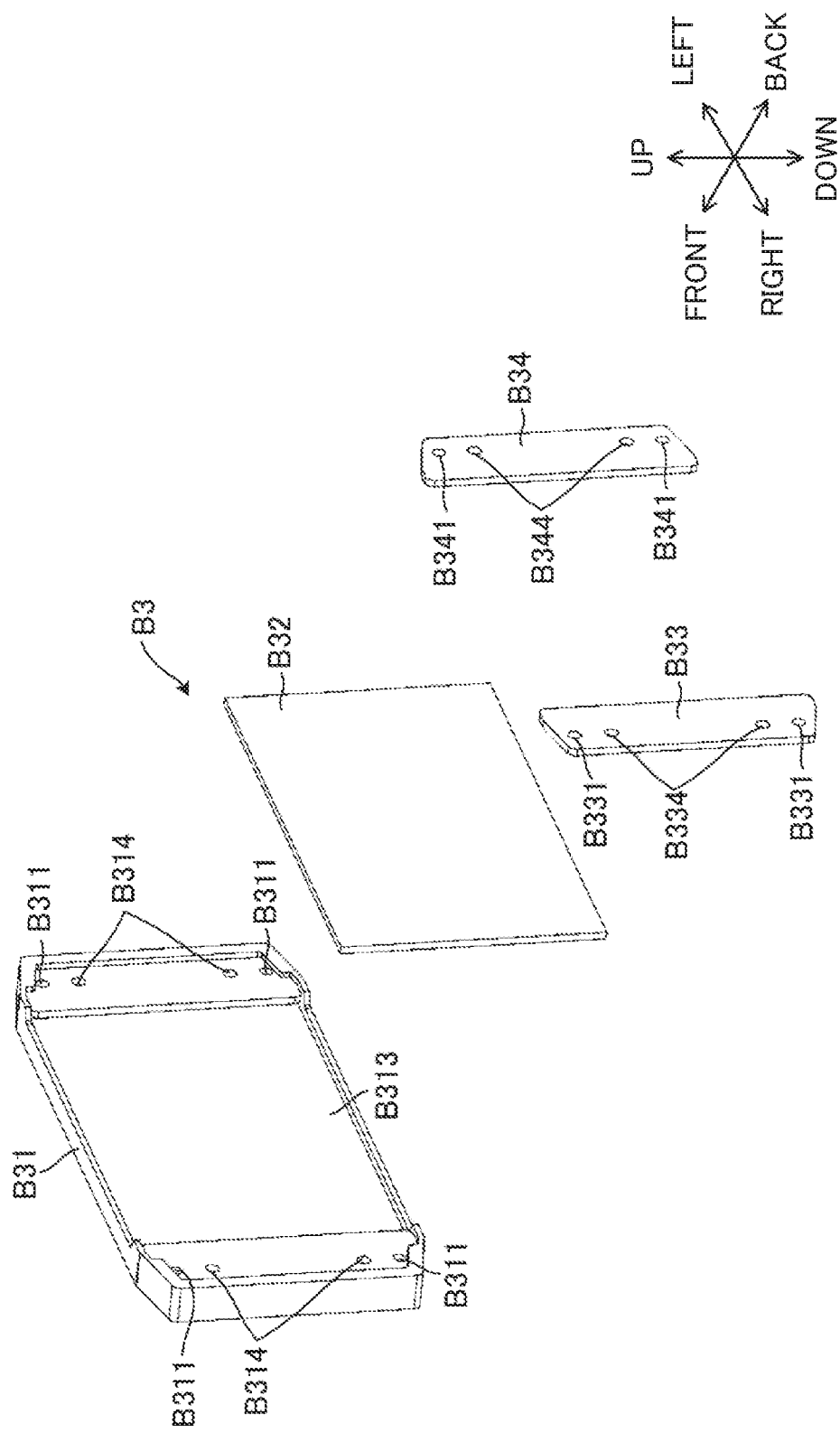
FIG. 6 is an exploded perspective view of a mirror mechanism B3.
Figure 7:
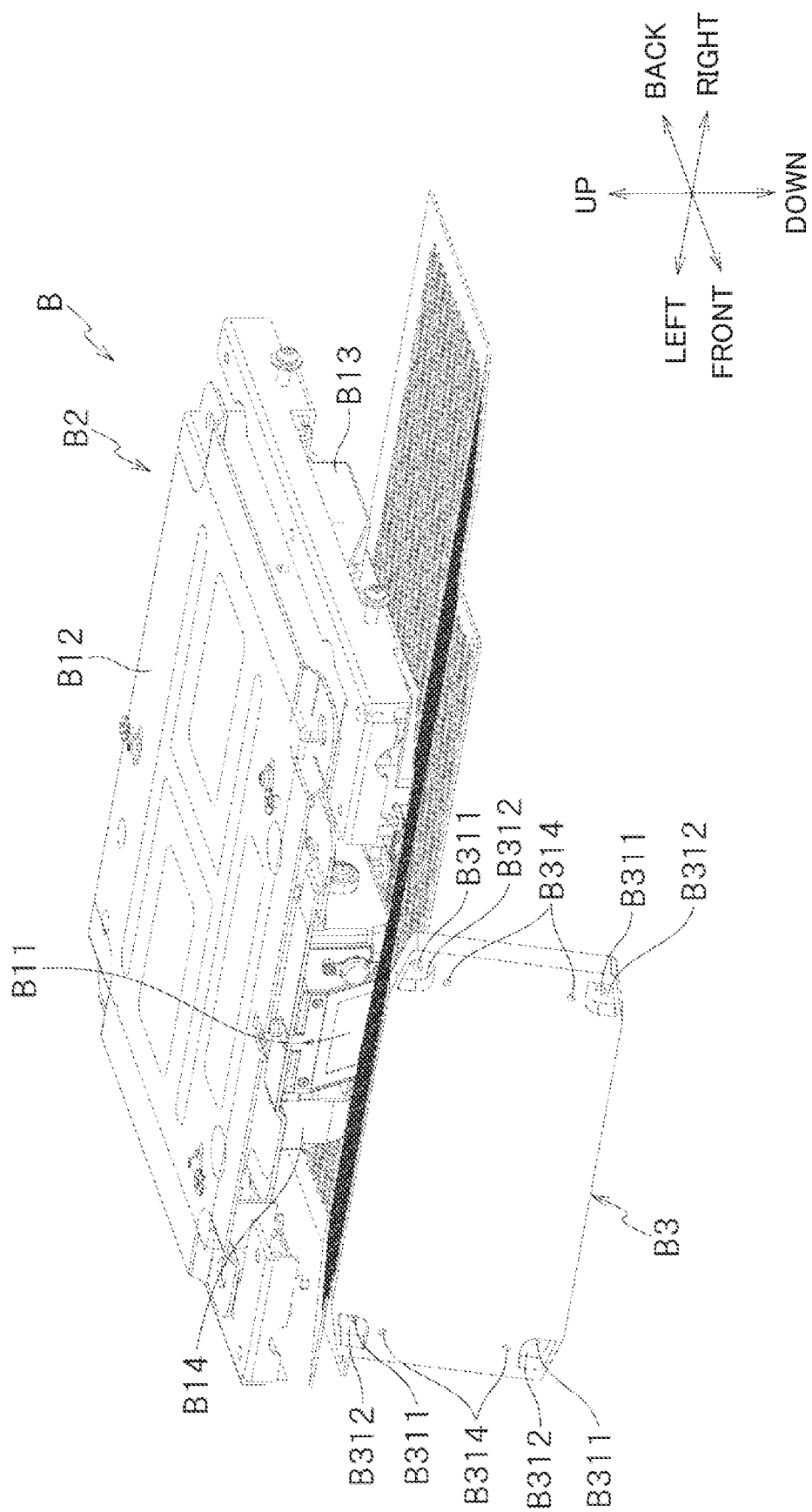
FIG. 7 is an explanatory diagram showing a positional relation between the projector mechanism B2 and the mirror mechanism B3.

As shown in FIG. 6, a mirror mechanism B3 provided to the mirror 10030 includes: a mirror holder B31; an optical mirror B32 accommodated in the mirror holder B31; and mirror stoppers B33 and B34 which fixes both end portions of the optical mirror B32 to the mirror holder B31. The mirror holder B31 is formed as a plate whose front surface is in a shape of a rectangular. In each of corner portions of the mirror holder B31, an angle adjustment hole B311 is formed, and with this angle adjustment hole B311 at the center, a recess B312 is formed on the front surface (see FIG. 7). Between the angle adjustment holes B311 relative to the vertical direction, there are formed attachment holes B314 symmetrically in the up and down.

Meanwhile, on the rear surface of the mirror holder B31 is formed a mirror holding part B313. The mirror holding part B313 is formed in a middle portion and has a size that does not overlap the angle adjustment holes B311 and the attachment holes B314. On the left side and the right side of the mirror holding part B313 are the mirror stoppers B33 and B34, respectively. The mirror stoppers B33 and B34 have angle adjustment holes B331 and B341, and attachment holes B334 and B344, respectively. The angle adjustment holes B331 and B341 and the attachment holes B334 and B344 of the mirror stoppers B33 and B34 are arranged so as to correspond to the angle adjustment holes B311 and the attachment holes B314 of the mirror holder B31, respectively.

The mirror stoppers B33 and B34 are formed so as to partially overlap with the mirror holding part B313. Thus, the mirror stoppers B33 and B34 abut side portions on both side of the optical mirror B32 fit in the mirror holding part B313, relative to the left/right direction, and are screw-fastened to the mirror holder B31 through the attachment holes B314, B334, and B344, thereby holding the optical mirror B32 on the mirror holder B31.

Figure 8:
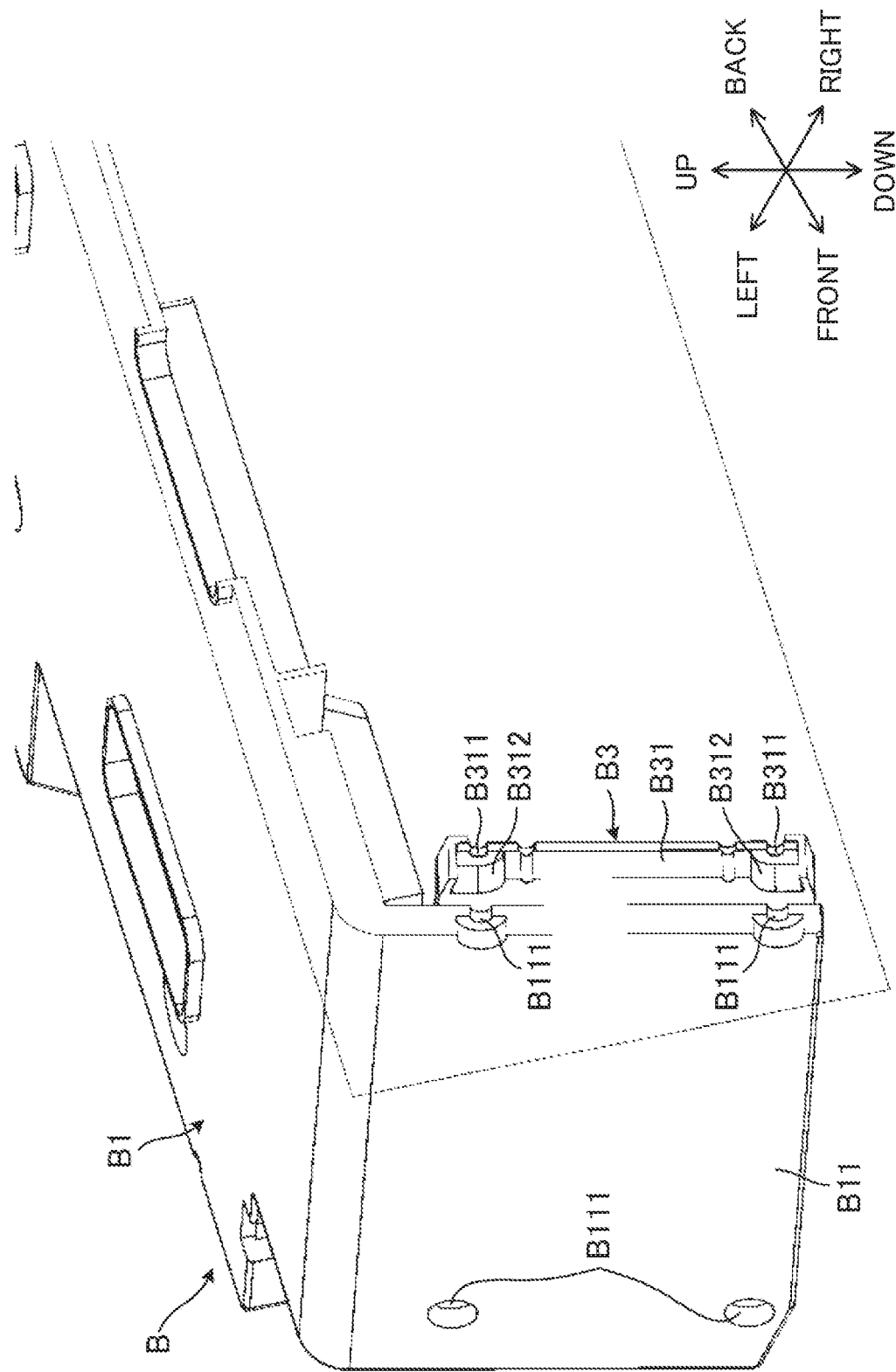
FIG. 8 is an explanatory diagram showing a state of attaching the mirror mechanism B3.

As shown in FIG. 8, the mirror mechanism B3 structured as described above is provided on an inside surface of the reflector holding part B11 of a projector cover B1 of the projector 10020. The reflector holding part B11 is formed at the front surface middle portion of the projector cover B1, and is arranged so as to be front exposed when the upper door mechanism UD is opened. The reflector holding part B11 has angle adjustment holes B111. The angle adjustment holes B111 are formed in positions corresponding to the angle adjustment holes B311 of the mirror mechanism B3.

Through each of the angle adjustment holes B111 of the reflector holding part B11 penetrates a not-shown screw from the front surface side, and the screw penetrates the angle adjustment hole B311 of the mirror holder B31. The angle adjustment holes B331 and B341 of the mirror stoppers B33 and B34 are each formed as a screw hole in which a screw can be screwed. The screws having penetrated through the angle adjustment holes B311 of the mirror holder B31 are screwed to the angle adjustment holes B331 and B341 of the mirror stoppers B33 and B34.

When the screws fastened to the angle adjustment holes B331 and B341 are rotated in a direction of loosening, the distance between the reflector holding part B11 and the mirror stoppers B33 and B34 becomes longer. On the other hand, when the screws fastened to the angle adjustment holes B331 and B341 are rotated in a direction of tightening, the distance between the reflector holding part B11 and the mirror stoppers B33 and B34 becomes shorter.

As described above, the mirror holder B31 and the mirror stoppers B33 and B34 are screw fastened through the attachment holes B314, B334, and B344. This way the optical mirror B32 is sandwiched between the mirror holder B31 and the mirror stoppers B33 and B34. The mirror holder B31, the optical mirror B32, and the mirror stoppers B33 and B34 are integrated as the mirror mechanism B3, and the distance between the reflector holding part B11 and the mirror mechanism B3 is increased or decreased by rotating the screws to change the distance between the reflector holding part B11 and the mirror stoppers B33 and B34. Further, the angle adjustment holes B311, B331, B341 arranged at four positions corresponding to the corner portions of the mirror mechanism B3 allows fine adjustment of the reflection angle of the optical mirror B32 with respect to the traveling direction of the illumination light emitted from the projector mechanism B2, by increasing or decreasing the distance between the reflector holding part B11 and the mirror mechanism B3, at the positions of arranging the angle adjustment holes B311, B331, and B341.

Between the reflector holding part B11 and the mirror holder B31 are provided not-shown springs. The rear end surface of each spring abuts the recess B312 on the mirror holder B31 while the front end surface of the same abuts the inner wall surface (area wall surface) of the reflector holding part B11, and the springs are sandwiched between the reflector holding part B11 and the mirror holder B31. Through each spring penetrates the screw passing through from the angle adjustment hole B111 of the reflector holding part B11. Thus, even if the distance between the reflector holding part B11 and the mirror mechanism B3 increases with the rotation of the screw, the biasing force exerted by the spring keeps the screw head to be in contact with the angle adjustment hole B111 of the reflector holding part B11, thereby preventing the screw head from sticking out from the angle adjustment hole B111 causing changes in the positional relation of the reflector holding part B11 and the screw.

With the above-described mechanical structure of the mirror mechanism B3, the mirror 10030 is able to reflect light projected from the projector 10020.

[Screen Unit 10040]

The reference goes back to FIG. 3. The screen unit 10040 has its side edges on the front surface side abutted to and supported by the lower frame UD100 of the upper door mechanism UD arranged on the front surface side of the cabinet G. Further, the screen unit 10040 is capable of displaying images on the front surface side, by light projected from the projector 10020 which is reflected forward on the mirror 10030, and incident on the back surface side (backward indicated in FIG. 3). That is, the light projected by the projector 10020 is incident on a back surface side of the screen unit 10040 from the inside of the casing 2. The screen unit 10040 lets the light incident on the back surface side of the screen unit 10040 pass to the front surface side of the screen unit 10040, thereby displaying an image on the front surface side of the screen unit 10040 positioned on the surface of the casing 2. Further, in the screen unit 10040, the later-described light-transmissive plate 10045 has a flat surface portion 10041 formed in a flat shape; curved portions 10042 continuous from side edges of the flat surface portion 10041 and formed in a curved shape; and side face portions 10043 continuous from the curved portions 10042, which are formed in a flat shape facing surfaces on directions different from of the flat surface portion 10041. The screen unit 10040 includes the light-transmissive plate 10045, a screen sheet 10046, and a lower pressing member UD101 and an upper pressing member UD102 serving as an interposing member. The later-described screen sheet 10046 is closely attached to the back surface side of the light-transmissive plate 10045, and fits with the shape of the light-transmissive plate 10045. Therefore, it has a flat shape at the flat surface portion 10041 and has a curved shape in the curved portions 10042. It should be noted that the flat surface portion 10041, the curved portions 10042, and the side face portions 10043 may have a portion with irregular surface or a shaped object.

The flat surface portion 10041 is disposed on the front surface side of the cabinet G, between a one dot chain lines on the left and the right indicated in FIG. 3. The curved portions 10042 are each curved from the side edges of the flat surface portion 10041 towards the front end side of the cabinet G, between the one dot chain line and a broken line in FIG. 3 (FIG. 3 only shows the broken line for the right side). The side face portions 10043 are each continuous from the side edges of the curved portions 10042, face directions perpendicular to the flat surface portion 10041, extend towards the front end of the cabinet G, and are arranged between the broken line of FIG. 3 (FIG. 3 only shows the broken line for the right side) and the cabinet G.

It should be noted that the present embodiment deals with a case where the screen unit 10040 has the curved portions 10042; however, the present invention is not limited to this. There may be provided sloped surfaces which extend from the side edges of the flat surface portion 10041 to the front end of the side face portions 10043 without curving, or alternatively, the side face portions 10043 may be provided directly continuous from the flat surface portion 10041, without providing the curved portions 10042. Further, the present embodiment deals with a case where the screen unit 10040 has the curved portions 10042 continued from the side edges of the flat surface portion 10041 relative to the left/right directions; however, the present invention is not limited to this, and the side edges of the flat surface portion 10041 relative to the vertical direction may be curved towards the front end side of the cabinet G.

Figure 9:
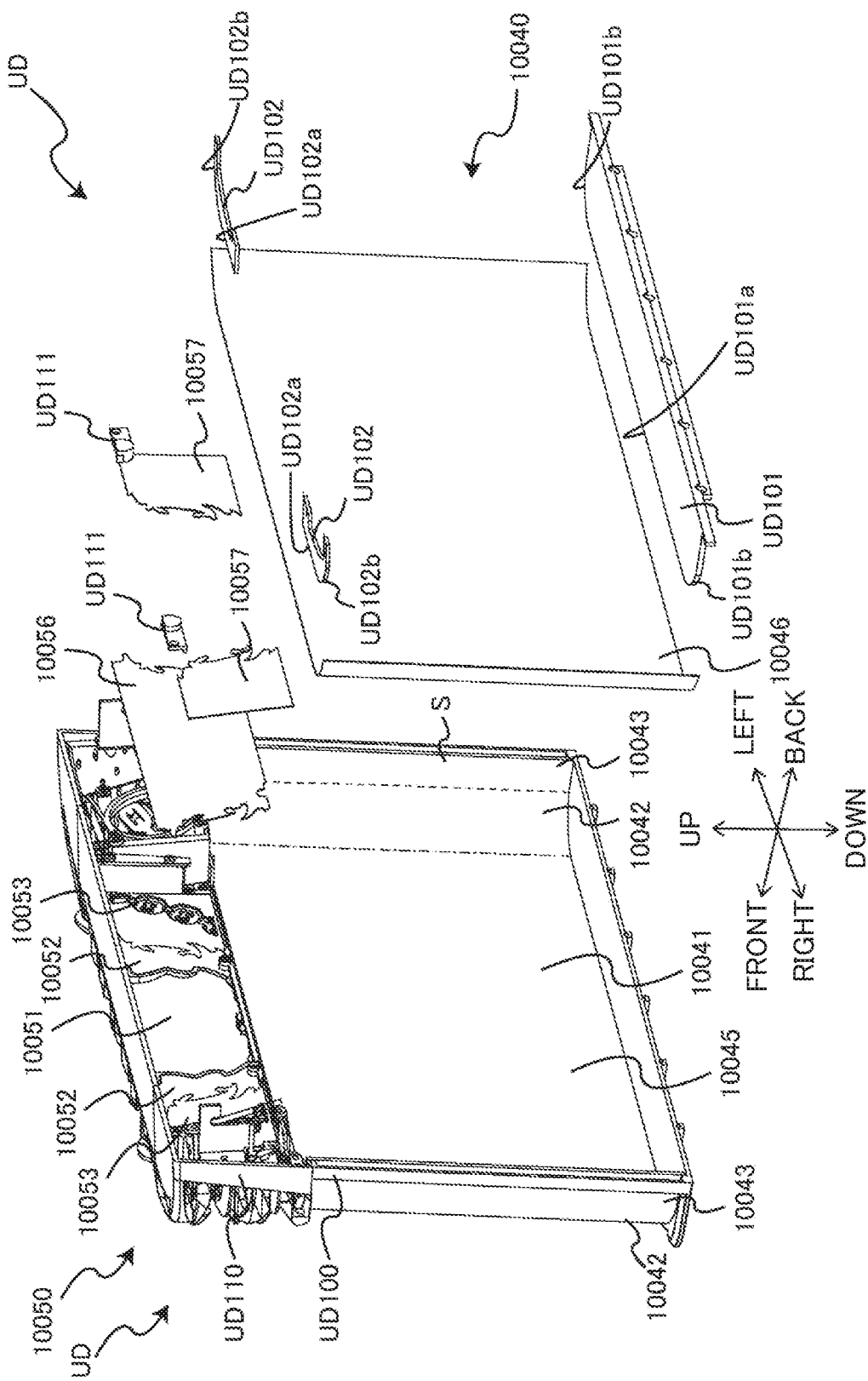
FIG. 9 is an exploded perspective view of an upper door mechanism UD.

FIG. 9 is an exploded perspective view of the upper door mechanism. FIG. 9 is a diagram of a view from the back right direction indicated in FIG. 3. Further, the one dot chain lines on FIGS. 3 and 9 indicate the borders between the flat surface portion 10041 and the curved portions 10042, and the broken lines indicate the border between the curved portions 10042 and the side face portions 10043.

The light-transmissive plate 10045 is mainly made of a light-transmissive resin such as acrylic board and the like. The curved portions 10042 of the light-transmissive plate 10045 are formed through a forming process (forming within an open space). This, as compared to a case of curving the acrylic board by heating or pressurization, prevents deformation of images displayed on the front surface side by the light incident on the back surface side. It should be noted that the light-transmissive plate 10045 is not limited to those made of a resin such as an acrylic board and the like, and may be made of any given material as long as the material is light-transmissive; e.g., a glass board and the like.

The screen sheet 10046 is an example image displaying part, and is closely attached to the back surface side (backward indicated in FIG. 9) of the light-transmissive plate 10045, on the flat surface portion 10041 and the curved portions 10042 continuous from the flat surface portion 10041 (in the example of FIG. 9, from the front surface side to the broken line). To this, light projected by the projector 10020 and reflected forward on the mirror 10030 is incident, and displays images on the front surface side. When light is not projected, the screen sheet 10046 is milky white, semi-transparent, or gray, so that the inside of the gaming machine 1 is not visible from outside. It should be noted that the image displaying part is not limited to the screen sheet 10046. For example, a paint that makes the light-transmissive plate 10045 a screen may be applied. Further, the screen sheet 10046 does not necessarily have to be closely attached to the back surface side of the light-transmissive plate 10045, and may be closely attached to the front surface side of the light-transmissive plate 10045.

Further, the screen sheet 10046 is arranged through out a range from a positions of the side face portions 10043, which positions are each a predetermined dimension (e.g., width dimension of each of the side face portions 10043) away from the front ends of the cabinet G (see FIG. 3), through the curved portions 10042, and to the flat surface portion 10041. As described, the screen unit 10040 has a gap S of a predetermined width between the screen sheet 10046 and the front end of the cabinet G, in which gap the screen sheet 10046 is not arranged on the back surface side of the light-transmissive plate 10045. It should be noted that the present embodiment deals with a case where the gap S is provided in a position overlapping with the side face portion 10043; however, the present invention is not limited to this. The screen sheet 10046 may be pasted so as to extend to a part of the side face portions 10043, and the other part of the side face portion 10043 may be the gap S where the screen sheet 10046 is not arranged. Further, a light-transmissive plate with a screen sheet arranged to the end portions of the light-transmissive plate may be provided in a position distanced from the front end of the cabinet G, and the gap S may be the part between the side edge of the light-transmissive plate and the front end of the cabinet G.

This way, no images are displayed in the gap S (see FIG. 3) where the screen sheet 10046 is not arranged. Further, for example, if no non-transparent sheet or the like is arranged on the gap S, the inside of the gaming machine 1 is slightly visible from outside through the gap S, which satisfies the curiosity of players. Since, there is a space between the mirror 10030 and the screen unit 10040, it is possible to give an impression that the images displayed on the screen unit 10040 appears to be floating on the front surface side of the space, when the inside of the gaming machine 1 is seen from the gap S.

The lower pressing member UD101 is arranged on the lower end of the back surface side of the screen sheet 10046 (backward indicated in FIG. 9), and fixed to the lower portion of the lower frame UD100 while pressing the light-transmissive plate 10045 and the screen sheet 10046 against the lower frame UD100, with the press surface UD101a.

The upper pressing members UD102 are each arranged on the upper end of the back surface side of the screen sheet 10046 (backward indicated in FIG. 9), and fixed to the upper portion of the lower frame UD100 while pressing the light-transmissive plate 10045 and the screen sheet 10046 against the lower frame UD100, with the press surface UD102a.

The press surface UD101a of the lower pressing member UD101 has, at its portions to be arranged on the curved portions 10042, curved shape portions UD101b each formed in a shape that fits with the back surface (rear surface shown in FIG. 9) of the corresponding one of the curved shape portions 10042 of the light-transmissive plate 10045. Further, the press surfaces UD102a of the upper pressing members UD102 each has, at its portion to be arranged on the corresponding one of the curved portions 10042, a curved shape portion UD102b formed in a shape that fits with the back surface (rear surface shown in FIG. 9) of the corresponding one of the curved shape portions 10042 of the light-transmissive plate 10045.

The screen sheet 10046, by being pressed against the back surface side of the light-transmissive plate 10045 with the lower pressing member UD101 and the upper pressing members UD102, is arranged and closely attached to the back surface side of the light-transmissive plate 10045; however, the present invention is not limited to this as long as the screen sheet is closely attached to the back surface side of the light-transmissive plate 10045, and the screen sheet may be adhered or deposited on the back surface side of the light-transmissive plate 10045.

[Decoration Unit 10050]

Returning to FIG. 3, the decoration unit 10050 is arranged above the screen unit 10040, and includes: a first structure body 10051 arranged in the middle of the front surface side of the upper frame UD110, a second structure body 10052 arranged around the first structure body 10051, and third structure bodies 10053 arranged on both sides of the second structure body 10052.

The first structure body 10051 is arranged in a position close to the screen unit 10040, and has a predetermined three-dimensional shape (a shape of text in the example of FIG. 3) made of a light-transmissive material (e.g., acrylic resin and the like). The second structure body 10052 is arranged adjacent to the first structure body 10051 and the third structure bodies 10053, and has a three-dimensional shape (a shape mocking a flame in the example of FIG. 3) made of a light-transmissive material (e.g., acrylic resin and the like), and has a half-mirror on its front surface side. The third structure bodies 10053 each has a three-dimensional shape (a shape mocking a chain in the example of FIG. 3) made of a light-transmissive material (e.g., acrylic resin and the like), and has a half-mirror on its front surface side.

Further, in the decoration unit 10050 as shown in FIG. 9, the first structure body 10051 and the second structure body 10052 are provided, on their back surface sides (backward indicated in FIG. 3), a prism sheet 10056 which is an example of a light diffusion member, and the third structure bodies 10053 are each provided, on their back surface sides, with a screen sheet 10057 which is an example of the image displaying part. The prism sheet 10056 is fixed to the back surface sides of the first structure body 10051 and the second structure body 10052 by the pressing member UD111. The screen sheets 10057 are fixed to the back surface sides of the third structure bodies 10053 by pressing members UD111. It should be noted that the light diffusion member is not limited to a sheet form member such as the prism sheet 10056 as long as it collects and diffuses light, and may be any given structure such as a resin made lens and the like.

[Relation Among Exposure Range to Light, Screen Unit 10040 and Decoration Unit 10050]

Figure 10:
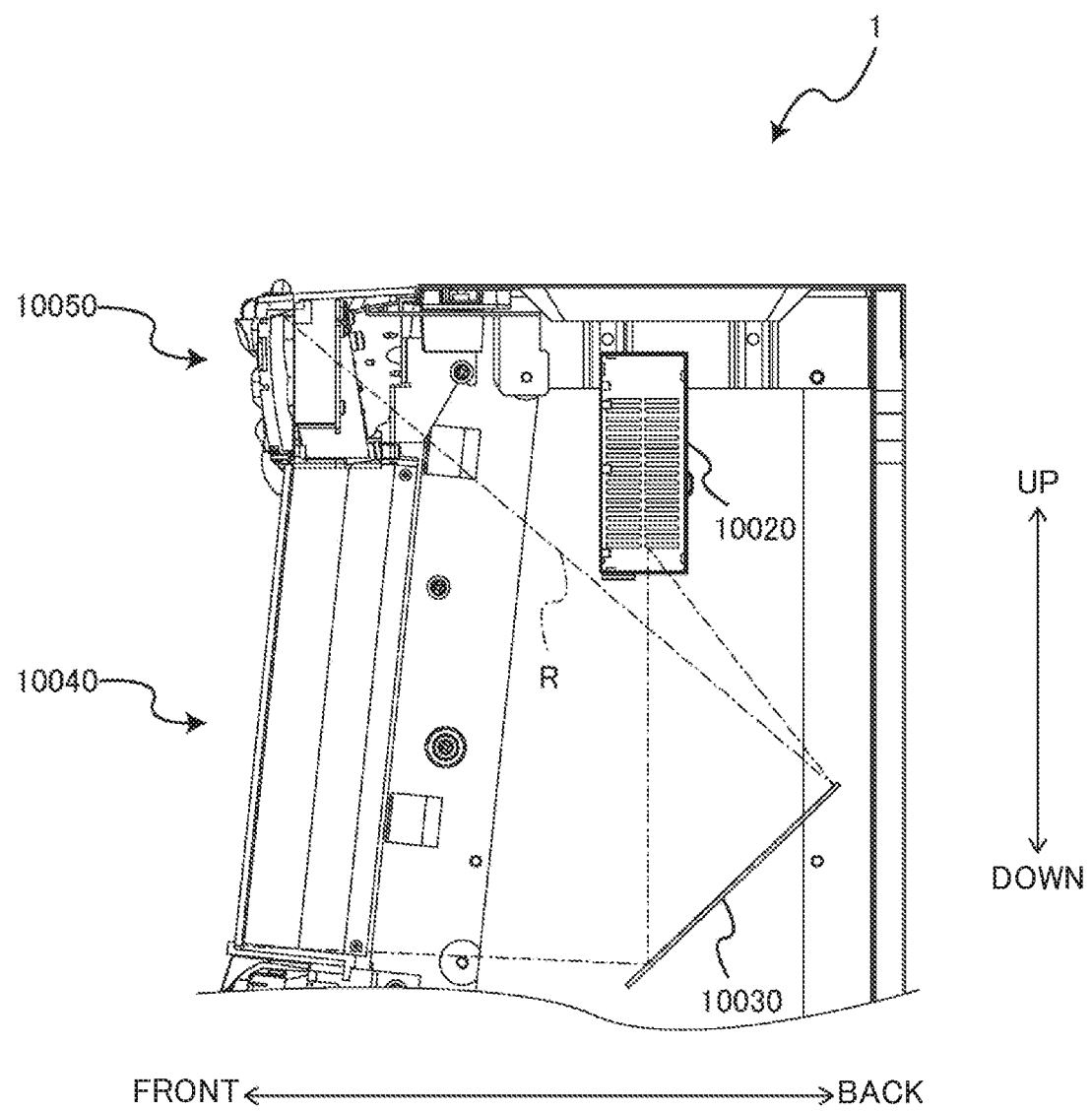
FIG. 10 is an explanatory diagram showing a relation among an exposure range to light projected from a projector 10020 and reflected on a mirror 10030 towards the front, a screen unit 10040, and a decoration unit 10050.
Figure 11:
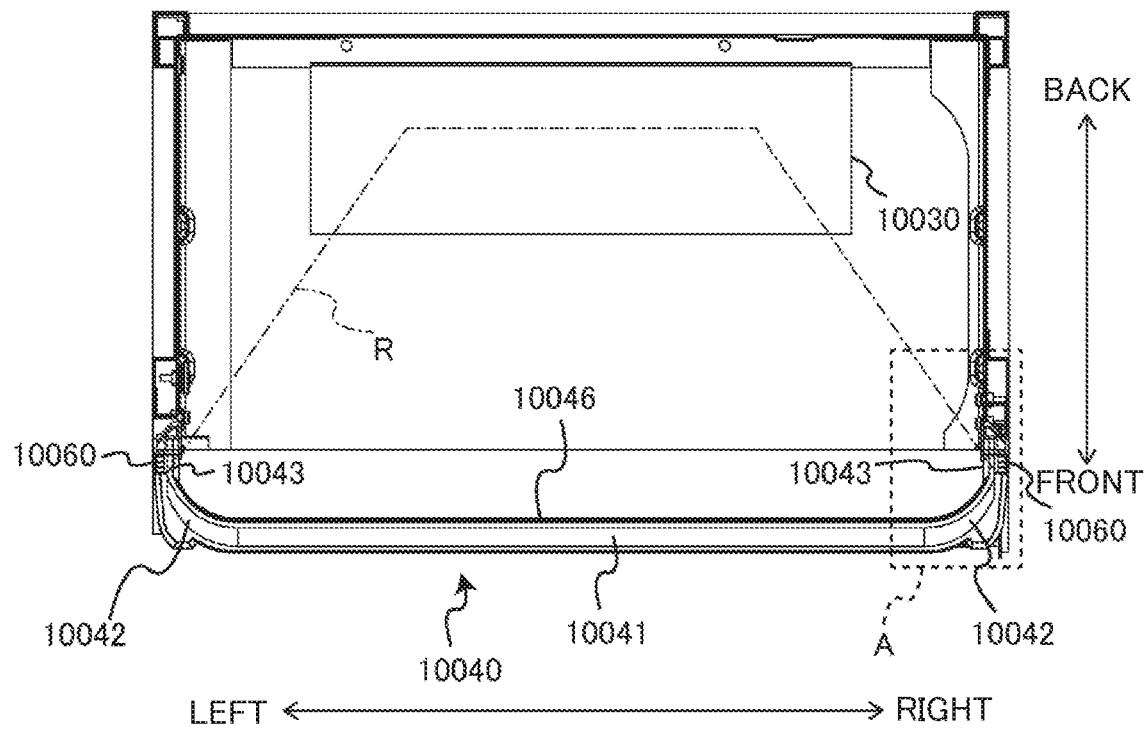
FIG. 11 is an explanatory diagram showing a relation among an exposure range to light projected from a projector 10020 and reflected on a mirror 10030 towards the front, a screen unit 10040, and a decoration unit 10050.

FIG. 10 and FIG. 11 are each an explanatory diagram showing a relation among an exposure range to light projected from a projector 10020 and reflected on a mirror 10030 towards the front, a screen unit 10040, and a decoration unit 10050.

In FIG. 10 and FIG. 11, the one dot chain line indicates a light-exposed range R. FIG. 10 is a diagram for explaining the light-exposed range R relative to the vertical direction. FIG. 11 is a diagram for explaining the light-exposed range R relative to the left/right direction.

The projector 10020 is installed in such a manner that its lens is directed downward. This way, the light projected from the projector 10020 travels downward, to the mirror 10030. As shown in FIG. 10, the light-exposed range R of light projected from the projector 10020 and reflected towards front by the mirror 10030 has its lower edge coincided with the lower end of the back surface side (backward indicated in FIG. 10) of the screen unit 10040, and has its upper edge coincided with the upper end of the back surface side (backward indicated in FIG. 10) of the decoration unit 10050.

The mirror 10030 is disposed below the projector 10020 and tilted in such a manner that its front side is lower than its backward side. This way, light projected from the projector 10020 and traveling downward is reflected towards front on the mirror 10030, incident on the back surface side (backward indicated in FIG. 3) of the screen unit 10040 and the decoration unit 10050, thereby displaying images on the front surface side (front side indicated in FIG. 3) of the screen unit 10040 and the decoration unit 10050.

As shown in FIG. 11, the light-exposed range R of light projected from the projector 10020 (see FIG. 11) and reflected towards front by the mirror 10030 has its left and right edges coincided with the rear ends of the curved portions 10042 of the screen unit 10040 (rear end of the screen sheet 10046). That is, the side face portions 10043 are out of the light-exposed range R, in the example of the present embodiment. It should be noted that, in cases where the screen sheet 10046 is pasted and extended to a part of these side face portions 10043, the light-exposed range R preferably encompasses the part of the side face portions 10043.

[Indirect Illumination Unit 10060]

Returning to FIG. 3, the indirect illumination unit 10060 serving as a light emitting unit is provided along the gap S where the screen sheet 10046 of the screen unit 10040 is not provided.

Figure 12:
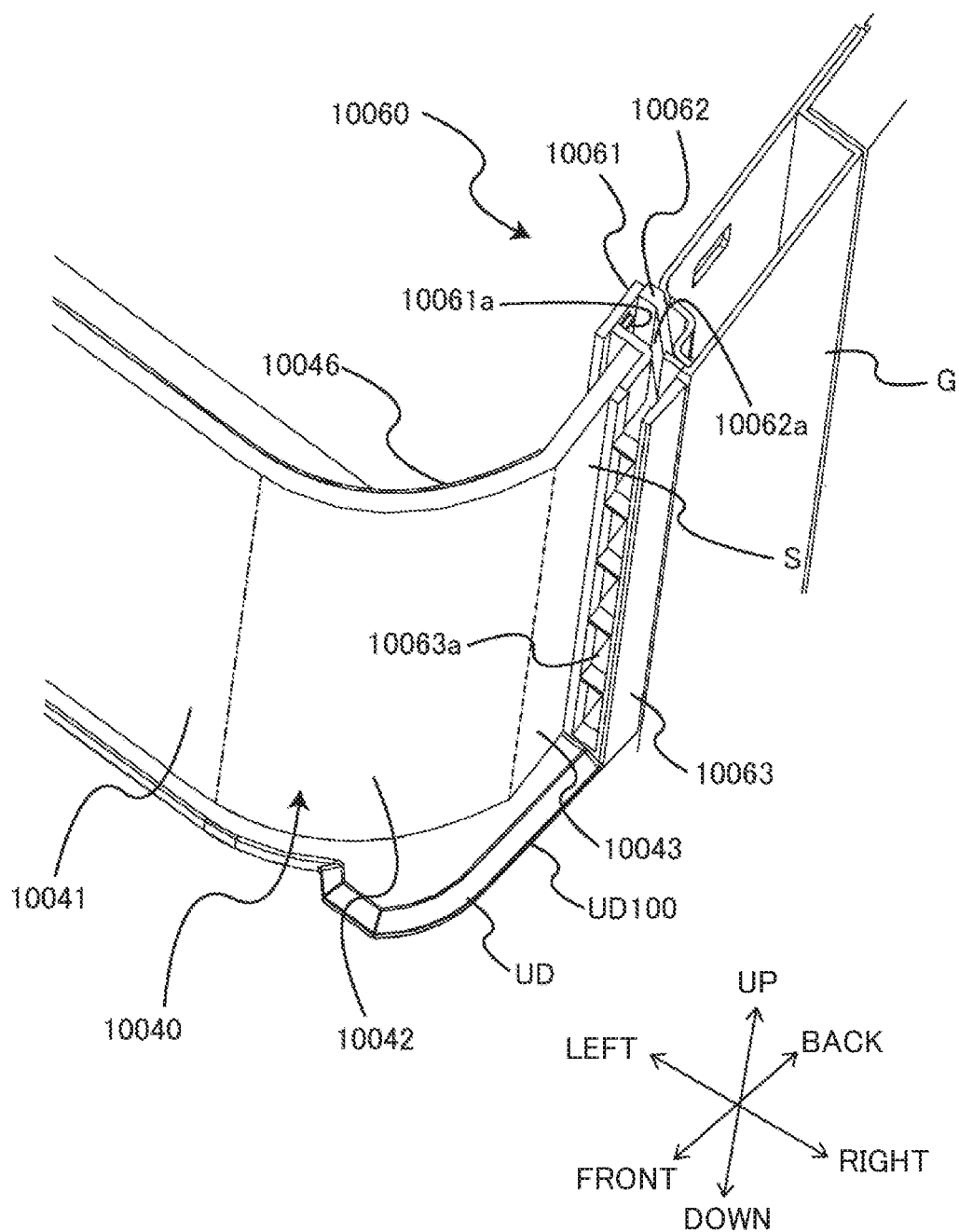
FIG. 12 is an explanatory diagram of an indirect illumination unit 10060.

FIG. 12 is an explanatory diagram of an indirect illumination unit. FIG. 12 is a perspective view showing an enlarged cross section of the range A indicated in FIG. 11. The indirect illumination unit 10060 includes an LED substrate 10061 and an optical guide member 10062 attached to the cabinet G, and a radiation member 10063 attached to the upper door mechanism UD.

Figure 13:
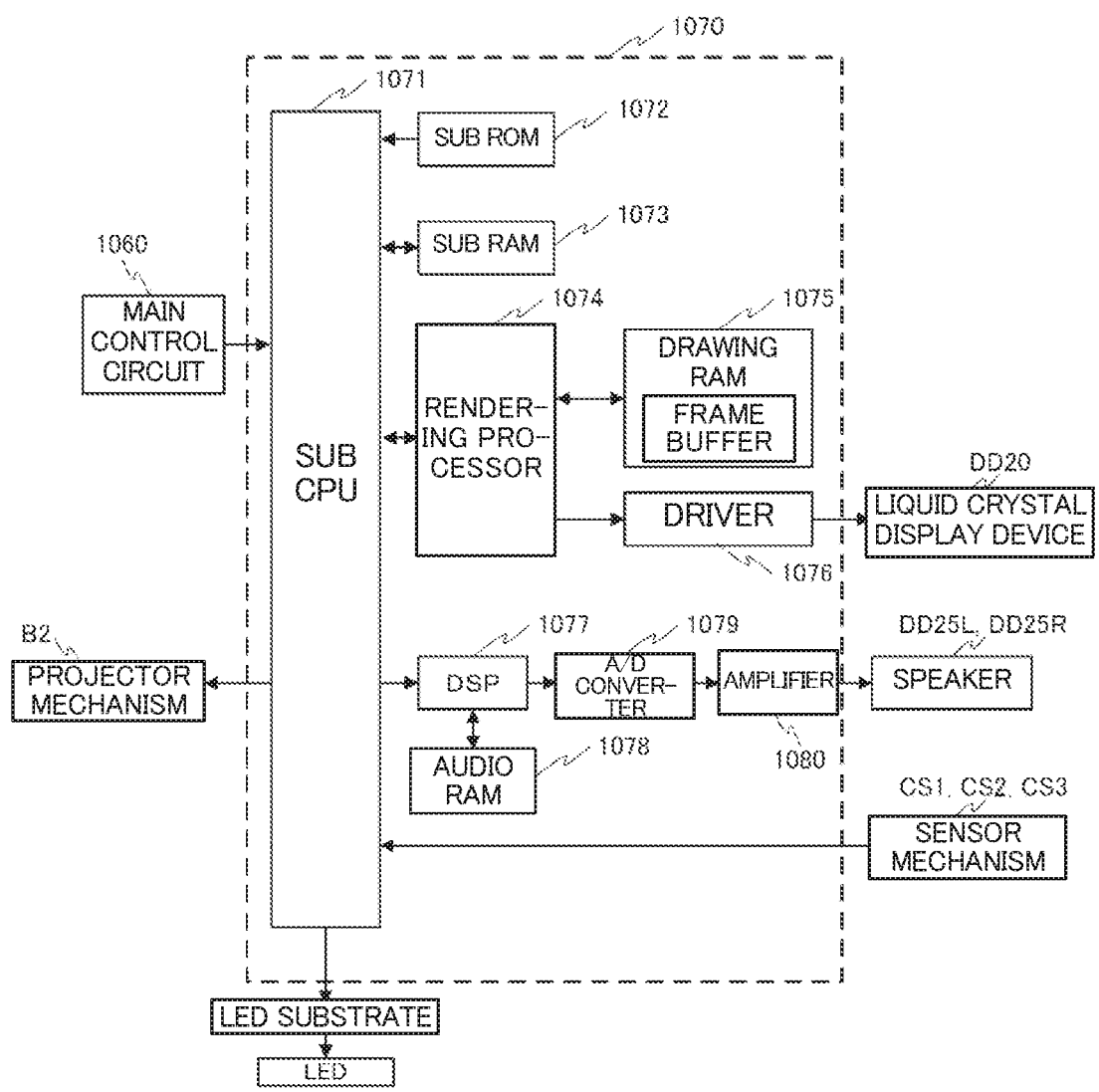
FIG. 13 is a block diagram showing an example circuit structure of the gaming machine 1.

The LED substrate 10061 extends along the side edge of the cabinet in the vertical direction, and a plurality of LEDs 10061a are aligned towards a direction different from the flat surface portion 10041 of the screen unit 10040 (e.g., towards left/right direction). The LED substrate 10061 is connected to a sub control circuit 1070 (see FIG. 13), and emits light from the LEDs 10061a under control of a sub CPU 1071 of the sub control circuit 1070 (see FIG. 13).

The optical guide member 10062 extends along the side edge of the cabinet G in the vertical direction, and forms an optical path 10062a whose one end is opened and faces the LEDs 10061a of the LED substrate 10061, while the other end is opened to the front end of the cabinet G.

The radiation member 10063 is provided to the upper frame UD110 of the upper door mechanism UD, along the side edge of the screen unit 10040 extended in the vertical direction, which extends in the forward/backward directions, and forms an optical path 10063a that radiates, in an area nearby the side edges of the screen sheet 10046 extended in the vertical direction, the light incident on the optical path 10062a formed by the optical guide member 10062.

<Control System of Gaming Machine 1>

The following describes a control system of the gaming machine 1, with reference to FIG. 12.

The present embodiment deals with a case where the gaming machine 1 is provided with a main control board MS (illustration omitted) and the sub controller SS (illustration omitted); however, the present invention is not limited to this. The gaming machine 1 may be provided with a single control board.

[Main Control Circuit 1060 and Sub Control Circuit 1070]

In cases where the gaming machine 1 includes the main control board MS and the sub controller SS, the main control board MS constitutes a main control circuit 1060. The main control circuit 1060 is a circuit that controls a main flow of games in the gaming machine 1. The sub controller SS constitutes a sub control circuit 1070. The sub control circuit 1070 is a circuit that controls execution of effects by displaying videos and the like.

The main control circuit 1060 has a microcomputer mounted on the main control board MS, as its main structuring element. The sub control circuit 1070 is electrically connected to the main control circuit 1060, and executes processes such as execution of effect content based on commands transmitted from the main control circuit 1060.

The sub control circuit 1070 essentially includes and structured by: a sub CPU 1071, a sub ROM 1072, a sub RAM 1073, a rendering processor 1074, a drawing RAM 1075, a driver 1076, DSP (Digital Signal Processor) 1077, an audio RAM 1078, an A/D converter 1079, and an amplifier 1080.

The sub CPU 1071 performs control of outputting video, sound, and light according to a control program stored in the sub ROM 1072, in response to commands transmitted from the main control circuit 1060. The sub RAM 1073 is provided with a storage area for registering thereon effect contents determined and effect data, and a storage area for storing various types of data such as resulting internal winning combinations transmitted from the main control circuit 1060, and results of symbol random determination process. Sub ROM 1072 is essentially structured by a program storage area and a data storage area.

In the program storage area is stored a control program executed by the sub CPU 1071. For example, the control program includes: a main substrate communication task for controlling communications with the main control circuit 1060; an effect registration task of extracting an effect-use random number for determining and registering effect content (effect data); a projection mapping control task for controlling displaying of video by the display unit A based on the determined effect content; an LED control task for controlling optical output from LEDs; an audio control task for controlling audio output by speakers DD25L and DD25R, and the like The data storage area includes: a storage area for storing various data tables; a storage area for storing effect data that constitutes various effect content; a storage area for storing animation data related to video creation; a storage area for storing sound data related to BGM and sound effects; a storage area for storing LED data related to on and off of light; and the like.

The sub control circuit 1070 is connected to, operation-controlled peripheral devices, such as the projector mechanism B2, the liquid crystal display device DD20, the speakers DD25L and DD25R, and the LED substrate.

The projector mechanism B2 is a transmissive liquid crystal projector, including: a light source, three liquid crystal panels corresponding to light of three principal colors of red, green, and blue, respectively, a lens which magnifies and emits light having passed through the liquid crystal panels, and a control unit which controls the light source and the liquid crystal panels. The control unit of the projector mechanism B2 controls on and off of the light source based on instructions from the sub CPU 1071, and performs a control to apply a drive voltage according to image data to each pixel of the liquid crystal panel.

The sub CPU 1071 controls the projector mechanism B2 to emit light of a video from the lens, thereby displaying the video on the screen unit 10040.

The sub CPU 1071 serving as a display controller (display controlling unit) performs a control to cause the projector 10020 (see FIG. 3) to emit light for displaying images related to the three-dimensional shapes of the first structure body 10051, the second structure body 10052, and the third structure bodies 10053. For example, as shown in FIG. 3, in cases where the second structure body 10052 has a three-dimensional shape mocking a flame, the sub CPU 1071 controls the projector 10020 to emit light, with respect to the second structure body 10052, so as to display an image of flickering flame. Further, in cases where the three-dimensional shape of each of the third structure bodies 10053 mocks the shape of a chain, the sub CPU 1071 controls the projector 10020 to emit light, with respect to the second structure body 10052, to display an image of a chain moving in a direction in which the three-dimensional shape mocking the chain extend. It should be noted that the images displayed on the first structure body 10051, the second structure body 10052, and the third structure bodies 10053 under the control by the sub CPU 1071 do not have to be necessarily images related to the three-dimensional shapes of the first structure body 10051, the second structure body 10052, and the third structure bodies 10053, and may be images irrelevant to the three-dimensional shapes, as long as the images are videos with motions. Even in such a case, there will be variation in the appearances of the first structure body 10051, the second structure body 10052, and the third structure bodies 10053 displaying or not displaying the videos with motions, which improves the visual effects.

The sub CPU 1071, the rendering processor 1074, the drawing RAM 1075 (including frame buffer) and the driver 1076 create a video according to animation data designated by the effect content, and displays the video created on the liquid crystal display device DD20.

Further, the sub CPU 1071, the DSP 1077, the audio RAM 1078, the A/D converter 1079, and the amplifier 1080 cause the speakers DD25L and DD25R to output sounds such as BGM, according to sound data designated by the effect content.

Further, the sub CPU 1071 controls the on and off of the LEDs through the LED substrate, according to LED data designated by the effect content.

[Electric and Optical Structures of Projector Mechanism B2]

Figure 14:
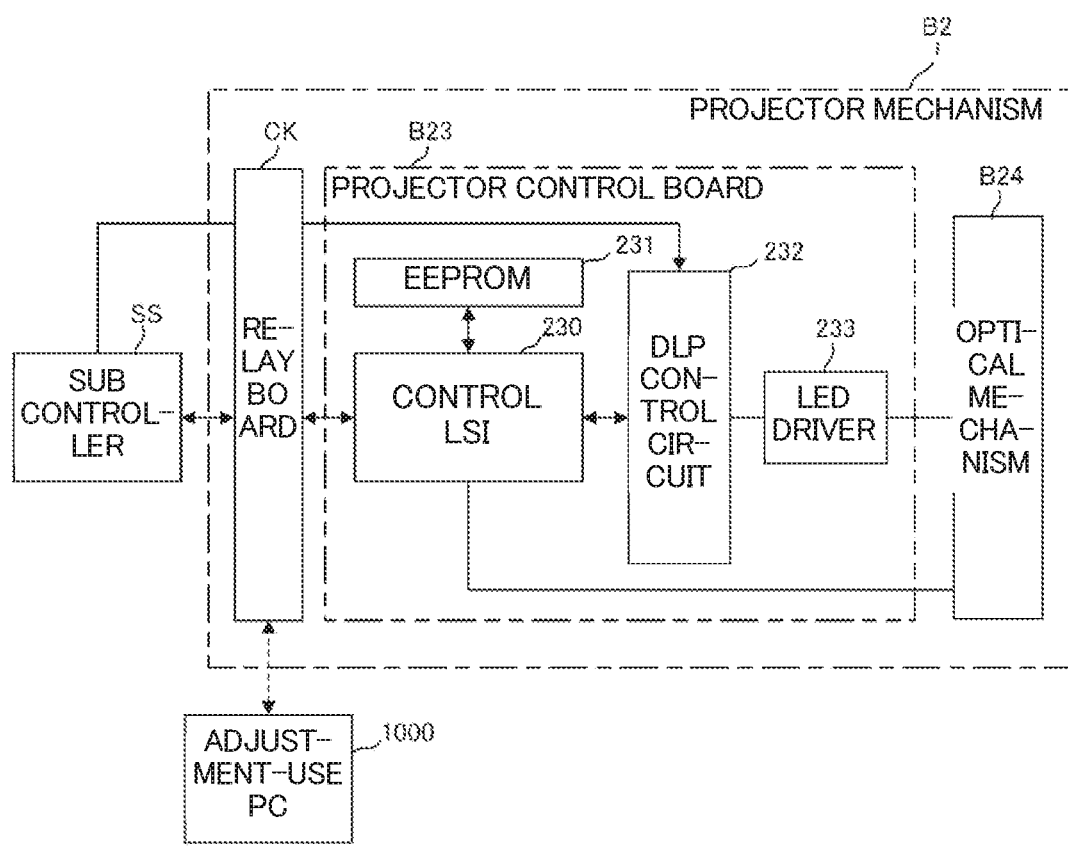
FIG. 14 is a block diagram showing a circuit structure of the projector mechanism B2.

FIG. 14 is a block diagram showing a circuit structure of the projector mechanism B2.

As shown in FIG. 14, the projector mechanism B2 includes, as electric structuring elements, the projector control board B23, an optical mechanism B24, and a relay board CK. The projector mechanism B2 is connected to the sub controller SS via the relay board CK. The sub controller SS controls the projector control board B23 according to effect operation of the screen, and displays a video as a visual effect by projecting illumination light on the screen via the optical mechanism B24. Further, to the relay board CK of the projector mechanism B2 is connected to an adjustment-use PC (personal computer) 1000. The adjustment-use PC (personal computer) 1000 is used for positional adjustment of illumination light projected from the projector mechanism B2 and for focus initial setting. Although the present embodiment deals with a case where the adjustment-use PC 1000 is adopted as an adjuster for the projector mechanism B2, the adjuster for the projector mechanism B2 may be a tablet PC, a so-called smartphone, or an exclusive terminal device in which an adjustment program (application software) is installed.

The projector control board B23 includes a control LSI 230, an EEPROM (registered trademark) 231, a DLP (registered trademark) control board 232, and an LED driver 233. The optical mechanism B24 includes, as structuring elements to be arranged around the lens unit B21 (see FIG. 5), an LED optical source configured to emit light of colors R (Red), G (green), and B (Blue), a DMD, a focus mechanism (not shown) configured to perform focus adjustment with respect to the projector lens 210 of the lens unit B21, and the like.

The control LSI 230 controls the DLP control circuit 232 so as to project illumination light based on an instruction from the sub controller SS. The control LSI 230 performs focus adjustment when projecting illumination light, by controlling the focus mechanism to move the projector lens 210 along an optical axial direction, based on an instruction of the sub controller SS. The EEPROM 231 stores a control program run by the control LSI 230 and data related to setting and adjustment of the projector mechanism B2.

The DLP system of the projector mechanism B2 is structured by and essentially includes the DLP control circuit 232, the LED driver, the LED optical source of the optical mechanism B24, and the DMD.

With the control by the DLP control circuit 232, light reflected to a predetermined direction by the DMD travels to the lens unit B21, and passes through the projector lens 210 and enters the mirror mechanism B3, after which the light is reflected on the mirror mechanism B3 and guided to a projection target. This way, illumination light is projected on the screen unit 10040 as the projection target, and video is formed according to the effect.

In the present embodiment, the projector mechanism B2 is structured as a so-called DLP projector. Further, the projector mechanism B2 gains a projection distance to the projection target by reflecting illuminated light by the mirror mechanism B3, while making the projection distance of the illumination light as short as possible by setting the contrast ratio to 1000:1 for example. This way, the display unit A including the projector mechanism B2 is downsized and structured at low costs, and is easily mountable to a limited space of the cabinet G of the gaming machine 1.

<Example Effect by Display Unit in the Form of Images>

Figure 15:
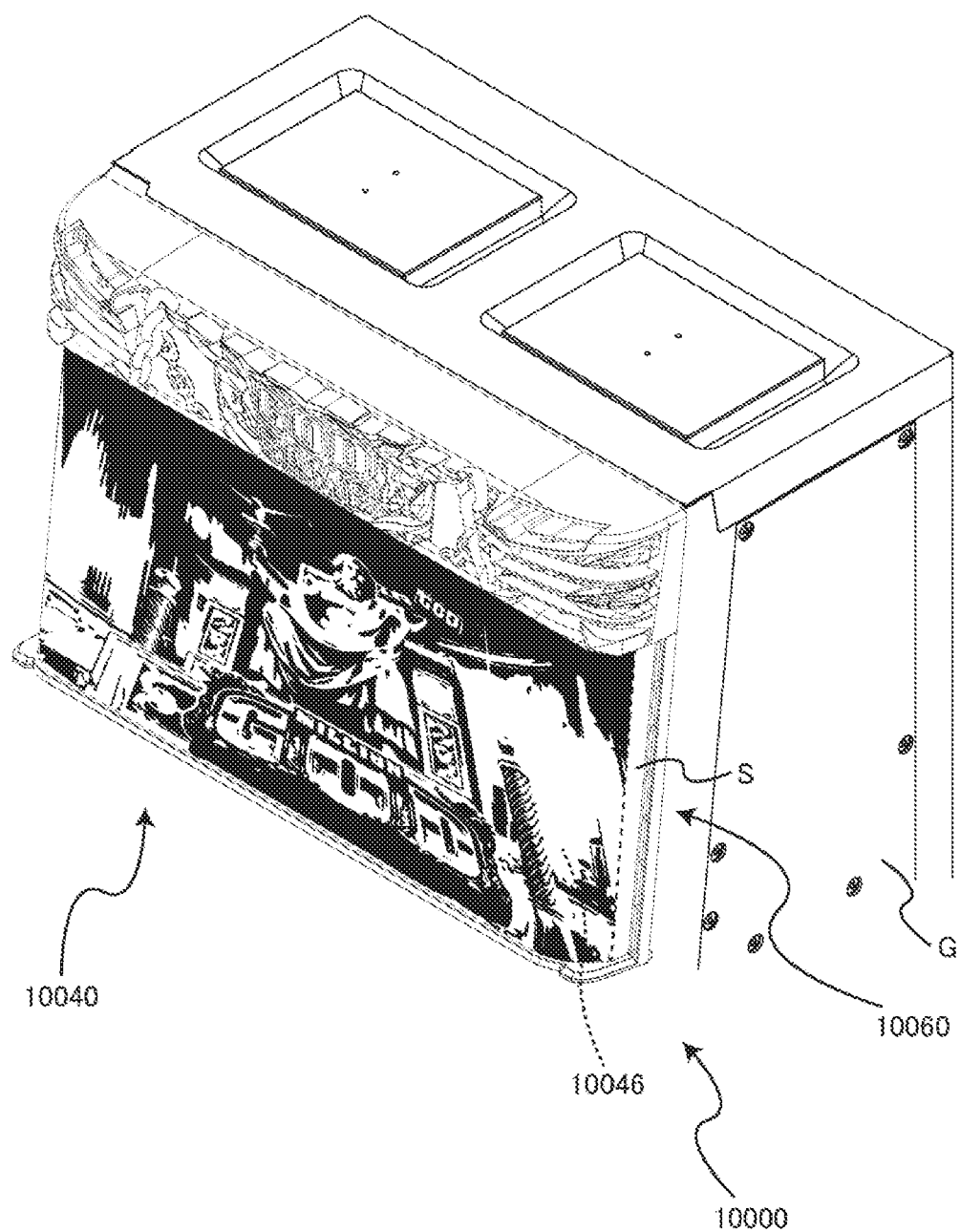
FIG. 15 is a diagram for explaining an example effect by images on a display unit.

FIG. 15 is a diagram for explaining an example effect by images on a display unit. The sub CPU 1071 (see FIG. 13) causes the projector 10020 (see FIG. 3) to emit light to display images in an area where the screen sheet 10046 of the screen unit 10040 is arranged. Then, the sub CPU 1071 (see FIG. 13) causes emission of light from the LEDs 10061a of the indirect illumination unit 10060 provided across the gap S from the border of the image displayed (side edges of the screen sheet 10046 (broken line in FIG. 15)). This way light is emitted towards front surface side in the gap S between the image and the cabinet G, and makes the border between the cabinet G and the image unnoticeable, thus enabling an effect by an image such that the image is floating on the front surface side of the cabinet G.

The gaming machine 1 of the present embodiment brings about the following actions and effects. With the gaming machine 1 of the present embodiment, an image is displayed on the front surface side of the screen unit 10040, and there is no need of providing a frame as in the case of the liquid crystal display device. As such the size of the screen does not have to be restricted by the frame. Further, by having the screen unit 10040 extended to the front end of the cabinet G of the gaming machine 1, it is possible to stretch the screen all the way to the front surface of the cabinet G, when viewed from the front surface side. Further, with the screen unit 10040 including the curved portions 10042, it is possible to represent a three-dimensional image, and makes the image representation such that an image appears to pop out towards the front surface side from the cabinet G of the gaming machine 1. As the result, there is provided a gaming machine capable of providing diverse type of image representation.

Further, the screen sheet 10046 is closely attached to the light-transmissive plate 10045 at the curved portions 10042, which prevents image displaying on the front surface side of the screen unit 10040 from being disturbed by a gap between the light-transmissive plate 10045 and the screen sheet 10046, or by wrinkles and the like formed on the screen sheet 10046.

Further, the upper door mechanism UD provided with the screen unit 10040 capable of displaying images is arranged on the front surface side of the cabinet G by hooking the hook UD120 on the inner surface side protruding member Gb of the cabinet G. This way there is no need for providing a hinge for jointing the upper door mechanism UD to the cabinet G, which makes the range for displaying images broader by the amount of hinge. As the result, there is provided a gaming machine in which a broader range for displaying an image is ensured.

Further, the upper door mechanism UD provided with the screen unit 10040 capable of displaying images is able to fix its upper portion side to the cabinet G by hooking its hook UD120 on the inner surface side protruding member Gb of the cabinet G, and fix—its lower portion side to the cabinet G by pressing its back surface side by the lower door mechanism DD. Therefore, even without a provision of a hinge, the upper door mechanism UD provided with the screen unit 10040 is stably fixed to the cabinet G, while making the range for displaying images broader.

Further, when light from the projector 10020 is projected to the screen unit 10040 and the first structure body 10051 having the prism sheet 10056, the brightness will be higher for the image displayed on the first structure body 10051 having the prism sheet 10056 with a higher light condensing effect than that of the screen sheet 10046 of the screen unit 10040. This differentiates the brightness for the image displayed on the screen unit 10040 and the image displayed on the first structure body 10051. As the result, there is provided a gaming machine capable of providing diverse type of image representation.

Further, for example, when the center of the light projected from the projector 10020 is directed to the screen unit 10040, the first structure body 10051 arranged in a position close to the screen unit 10040 becomes subjected to a portion of light distanced from the center. The brightness of the light projected from the projector 10020 may drop with an increase in the distance from the center. In such a case however, by arranging the prism sheet 10056 whose light condensing effect is higher than that of the screen sheet 10046 in the first structure body 10051 disposed in a position where the brightness is lower, it is possible to display images with the brightness restrained from decreasing, even in a position distanced from the center of the light projected from the projector 10020.

Further, since the screen unit 10040 is provided with the curved portions 10042, representation of three-dimensional images is also possible on the screen unit 10040, in addition to the first structure body 10051 formed in a three-dimensional shape. By combining these, it is possible to display images with different bright nesses from one another. As the result, there is provided a gaming machine capable of providing further diverse type of image representation.

Further, by arranging the flat surface portion 10041 of the screen unit 10040 on the front surface side of the cabinet G, and curving the curved portions 10042 from the side edges of the flat surface portion 10041 towards the front ends of the cabinet G, it is possible to make representation of images on the screen unit 10040 such that images appear to pop out on the front surface side from the cabinet G of the gaming machine 1. Thus, by combining the three-dimensional image representation on the screen unit 10040 with the image representation on the first structure body 10051 formed in a three-dimensional shape, it is possible to display images whose brightnesses are different from each other. As the result, there is provided a gaming machine capable of providing further diverse type of image representation.

Further, the third structure bodies 10053 each of which has the half-mirror formed in a three-dimensional shape reflect the surrounding scene on the three-dimensional shape, while no light is projected from the projector 10020, and displays an image related to the three-dimensional shape when light is projected from the projector 10020. This provides an unpredictable effect such that the third structure bodies 10053 reflecting the surrounding scene display an image related to their three-dimensional shapes. As the result, there is provided a gaming machine capable of providing diverse type of image representation.

Further, apart from the third structure bodies 10053, the second structure body 10052 having the half-mirror formed in a three-dimensional shape reflects the surrounding scene on the three-dimensional shape, while no light is projected from the projector 10020, and displays an image related to the three-dimensional shape when light is projected from the projector 10020. When light from the projector 10020 is projected to the third structure bodies 10053 each having the screen sheet 10057 and the second structure body 10052 having the prism sheet 10056, the brightness becomes higher for the image displayed on the second structure body 10052 having the prism sheet 10056 with a higher light condensing effect than that of the screen sheet 10057 of the third structure bodies 10053. This differentiates the brightness for the image displayed on the third structure bodies 10053 and the image displayed on the second structure body 10052. As the result, there is provided a gaming machine capable of providing diverse type of image representation.

Further, although formation of the half-mirror on the front surface side causes a decrease in the transmissivity of the second structure body 10052, arrangement of prism sheet 10056 on the back surface side improves the light condensing effect, and prevents a drop in the brightness of the image displayed on the second structure body 10052.

Further, the light-transmissive plate 10045 of the screen unit 10040 is formed rather on the front surface side of the cabinet G than the cabinet G, and the screen sheet 10046 is arranged on the light-transmissive plate 10045. This enables displaying of three-dimensional images such that the image pops out from the front end of the cabinet G. The screen unit 10040, which is for displaying images on its front surface side with light projected from the projector 10020, is provided with a gap S of a predetermined width where no screen sheet 10046 is disposed on the back surface side of the light-transmissive plate 10045, between the screen sheet 10046 and the front end of the cabinet G. Therefore images are not displayed in this gap S. This makes it possible representation of images such that images appear to be floating at a position apart from the front end of the cabinet G. As the result, there is provided a gaming machine capable of providing diverse type of image representation.

By arranging the indirect illumination unit 10060 in the gap G between the front end of the cabinet G and the display area (the area in which the screen sheet 10046 is arranged), the edge of images on the front end side of the cabinet G is emphasized. This makes it possible further emphasized representation of images such that images appear to be floating at a position apart from the front end of the cabinet G. As the result, there is provided a gaming machine capable of providing further diverse type of image representation.

<Modification: Correction of Projected Image>

Although this is not essential, to reduce geometrical deformation in a projected image without a use of a high performance device, it is preferable to connect the relay board CK of the projector mechanism B2 (see FIG. 14) to an imaging device (not illustrated) even if the projection target has a three-dimensional shape.

An imaging device 1000 is capable of capturing an image projected on the screen unit 10040, and is not particularly limited as long as it is a device electrically connectable to the relay board CK of the projector mechanism B2. An example of the imaging device 1000 is a smartphone with a camera.

The following describes a correction process of deformation in a projected image, with reference to FIG. 16.

[Step S1: Setting Up of Imaging Device]

First, a manager sets up an imaging device to a view point of a player (or nearby the view point of the player) (Step S1).

[Step S2: Three-Dimensional Shape Measurement Process]

Next, the projector mechanism B2 executes a process of measuring a three-dimensional shape on the screen unit 10040 (Step S2).

The following describes a process operation of the projector mechanism B2 in the three-dimensional shape measurement process.

First, the control LSI 230 controls the DLP control circuit 232 to project a test image for the three-dimensional shape measurement stored in the EEPROM 231, based on an instruction from the adjustment-use PC 1000. With the control by the DLP control circuit 232, light reflected to a predetermined direction by the DMD travels to the lens unit B21, and passes through the projector lens 210 and enters the mirror mechanism B3, after which the light is reflected on the mirror mechanism B3 and guided to a projection target. This way, illumination light is projected on the screen unit 10040 as the projection target, and video is formed according to the test image for the three-dimensional shape measurement.

Next, the manager captures the test image for the three-dimensional shape measurement projected on the screen unit 10040 by using the imaging device. The image captured is transmitted from the imaging device to the control LSI 230 via the relay board CK. Then, the control LSI 230 compares the image captured with the test image for the three-dimensional shape measurement stored in the EEPROM 231, to obtain three-dimensional measurement data of the projection target.

The three-dimensional shape data of the projection target obtained by the control LSI 230 is stored in the EEPROM 231.

[Step S3: Rough Adjustment Process]

Next, the projector mechanism B2 executes a process of roughly adjusting deformation in the projected image (Step S3).

The following describes a process operation of the projector mechanism B2 in the rough adjustment process.

First, the control LSI 230 controls the DLP control circuit 232 to project a test image for a first adjustment stored in the EEPROM 231, based on an instruction from the adjustment-use PC 1000. An example of the test image for the first adjustment is an image having a marker in each of four corners; however, the image is not limited to this.

Next, the manager captures the test image for the first adjustment projected on the screen unit 10040 by using the imaging device. The image captured is transmitted from the imaging device to the control LSI 230 via the relay board CK. Then, the control LSI 230 compares the image captured with the test image for the first adjustment stored in the EEPROM 231, based on the coordinates of the projection points of the projector 10020 and the three-dimensional shape of the projection target stored in the EEPROM 231, to calculate—the coordinates of the image capturing point of the imaging device (rough adjustment-use view point).

Next, the control LSI 230 reads a test image for a second adjustment stored in the EEPROM 231. An example of the test image for the second adjustment is an image having a plaid grid pattern in which a white square and a black square are alternately arranged; however, the image is not limited to this.

Next, the control LSI 230 performs the rough adjustment process to the test image for the second adjustment, based on the information related to the coordinates of the projection points of the projector 10020 and the information related to the image capturing point of the imaging device (rough adjustment-use view point). Specifically, the control LSI 230 performs the rough correction process with respect to the test image for the second adjustment so that there is no geometrical deformation in the image when viewed from the image capturing point of the imaging device (rough adjustment-use view point), and obtains data of the test image after the rough adjustment process.

[Steps S4 to S9: Precision Adjustment Process]

Next, the projector mechanism B2 executes a process of precisely correcting geometrical image deformation taking place in the image after the rough adjustment process (Steps S4 to S9).

The following describes a process operation of the projector mechanism B2 in the precision adjustment process.

First, the control LSI 230 controls the DLP control circuit 232 to project a test image after the rough adjustment process (Step S4). Next, the manager captures the test image after the rough adjustment projected on the screen unit 10040 by using the imaging device (Step S5). The manager causes the imaging device to transmit the captured test image after the rough adjustment to the control LSI 230 via the relay board CK (Step S6).

Next, the control LSI 230 compares the test image after the rough adjustment obtained through the rough adjustment process (i.e., test image for the precision adjustment) with the image captured by the imaging device, to calculate the amount of image deformation (Step S7). The amount of image deformation is derived by, for example, executing an edge detection or a pattern recognition process, and totaling the absolute values (or the square values) of differences in the positions of the image (corresponding pixel positions) between an original image and the captured image of a predetermined image pattern.

Next, the control LSI 230 determines whether or not the amount of image deformation calculated in Step S7 is greater than a predetermined threshold (Step S8). When this determination results in Yes, the control LSI 230 executes a process of shifting the image capturing point of the imaging device set up in a predetermined direction by a predetermined distance (Step S9). Then, Step S4 to Step S9 are repeated until the amount of image deformation becomes the predetermined threshold or lower.

To the contrary, when Step S8 results in No, the control LSI 230 ends the correction process of deformation in the projected image.

It should be noted that the above deals with a case where the process of Step S7 to Step S9 automatically determines and correct the image deformation; however, the present invention is not limited to this, and the manager may visually determine the deformation in the image and instruct the result of presence/absence of image deformation through the adjustment-use PC 1000.

This way, the gaming machine of the present modification is able to perform projection on any given projection target of a three-dimensional shape. The projector executes the process of appropriately correcting geometrical deformation in the projected image. This gaming machine does not require a traditionally executed complex calculation process using a high-performance device for accurately specifying a view point of a user.

Additional Remark

An embodiment of the present invention is described hereinabove. The gaming machine 1 of the present embodiment brings about the following characteristics.

[First Mode]

Traditionally, as in the gaming machine suggested in Japanese Laid-Open Patent Publication No. 2005-46374, when the image display device is a liquid crystal display device, there are problems that the screen is flat, and the effect representation by images is limited. Further, since the liquid crystal display device is provided inside an exterior member of the gaming machine, the size of the screen is restricted by the exterior member or the frame of the liquid crystal display device, consequently restricting the effect representation by images.

In view of the above problems, the present invention is made and it is an object of the present invention to provide a gaming machine capable of providing diverse types of image representation.

The present invention provides gaming machines as follows.

(1-1) A gaming machine of the present mode (e.g., gaming machine 1 and the like) includes:
    an exterior member whose at least front surface side is opened (e.g., cabinet G);
    a screen disposed on a front surface side of the exterior member (e.g., screen unit 10040, and the like); and
    a projector (e.g., projector 10020 and the like) configured to project light for displaying an image on the screen, wherein
    the screen is capable of displaying an image on the front surface side with light projected from the projector and incident on the back surface side, and
    the screen includes a flat surface portion arranged on the front surface side of the exterior member, which is formed in a flat shape (e.g., flat surface portion 10041, and the like), and a curved portion which is curved from a side edge of the flat surface portion towards the front end side of the exterior member (e.g., curved portions 10042).

The gaming machine having such a structure includes the exterior member, the screen, and the projector. The exterior member has at least its front surface side opened. The screen is disposed on the front surface side of the exterior member. The projector projects light for displaying images on the screen. Further, the screen is capable of displaying image on the front surface side, by light projected from the projector incident on the back surface side of the screen, and includes the flat surface portion and the curved portion. The flat surface portion is arranged on the front surface side of the exterior member, and is formed in a flat shape. The curved portion is curved from a side edge of the flat surface portion towards the front end side of the exterior member.

This way, an image is displayed on the front surface side of the screen, and there is no need of providing a frame as in the case of the liquid crystal display device. As such the size of the screen does not have to be restricted by the frame. Further, by having the screen extended to the front end of the exterior member of the gaming machine, it is possible to stretch the screen all the way to the exterior member, when viewed from the front surface side. Further, with the screen surface including the curved portion, the position of an image displayed on the curved portion relative to the depth direction is made different from that of an image displayed on the flat surface portion. This enables representation of a three-dimensional image, and makes the image representation such that an image appears to pop out towards the front surface side from the exterior member of the gaming machine. As the result, there is provided a gaming machine capable of providing diverse type of image representation.

(1-2) In addition to the above structure, the gaming machine of the present mode is such that
    the screen includes
    a light-transmissive plate formed by a light-transmissive material (e.g., light-transmissive plate 10045, and the like); a screen sheet disposed on a back surface side of the light-transmissive plate (e.g., screen sheet 10046, and the like); and an interposing member having a press surface configured to press the screen sheet against the light-transmissive plate (e.g., upper pressing member UD102, and the like), wherein
    the press surface of the interposing member (e.g., press surface UD102*a*, and the like) has a curved shape portion (e.g., curved shape portion UD102*b*, and the like) whose shape matches with the curved portion.

In the gaming machine of such a structure, the screen includes the light-transmissive plate, the screen sheet, and the interposing member. The light-transmissive plate is made of a light-transmissive material. The screen sheet is disposed on the back surface side of the light-transmissive plate. The interposing member presses the screen sheet against the light-transmissive plate by the press surface. The press surface of the interposing member has the curved shape portion whose shape matches with the curved portion.

This way the screen sheet is closely attached to the light-transmissive plate at the curved portion, which prevents image displaying on the front surface side of the screen from being disturbed by a gap between the light-transmissive plate and the screen sheet, or by wrinkles and the like formed on the screen sheet.

With the present mode, there is provided a gaming machine capable of providing diverse type of image representation.

[Second Mode]

The gaming machine suggested in Japanese Laid-Open Patent Publication No. 2005-46374 has a front door on the front surface side of the casing. This front door is provided with a hinge which enables the door to open and close with respect to the casing. However, there are still many issues to solve so that this hinge narrows the area for displaying images on the image display device formed on the front door.

In view of the above problems, the present mode is made and it is an object of the present mode to provide a gaming machine in which a broader range for displaying image is ensured.

The present invention provides gaming machines as follows.

(2-1) A gaming machine of the present mode (e.g., gaming machine 1 and the like) includes:

an exterior member whose at least front surface side is opened (e.g., cabinet G);

a screen disposed on a front surface side of the exterior member (e.g., screen unit 10040, and the like);

a projector (e.g., projector 10020 and the like) configured to project light for displaying an image on the screen; and a front side member (e.g., upper door mechanism UD and the like) disposed on the front surface side of the exterior member, and at least including a screen, wherein the screen is capable of displaying an image on the front surface side with light projected from the projector and incident on a back surface side, the exterior member is provided with a protrusion (e.g., inner surface side protruding member Gb, and the like) protruding from an inner surface, and the front side member has a hook (e.g., hook UD120, and the like) configured to be hooked on the protrusion.

A gaming machine with such a structure has the exterior member, screen, projector and the front side member. The exterior member has at least its front surface side opened. The screen is disposed on the front surface side of the exterior member. The projector projects light for displaying images on the screen. The front side member is provided with at least the screen, and is disposed on the front surface side of the exterior member. Further, the screen is capable of displaying image on the front surface side, by light projected from the projector incident on the back surface side of the screen. The exterior member is provided with the protrusion protruding from the inner surface. Further, the front side member has the hook configured to be hooked on the protrusion.

Thus, the front side member provided with the screen capable of displaying images is disposed on the front surface side of the exterior member by hooking the hook to the protrusion of the exterior member. This way there is no need for providing a hinge for jointing the front side member to the exterior member, which makes the range for displaying images broader by the amount of hinge. As the result, there is provided a gaming machine in which a broader range for displaying an image is ensured.

(2-2) In addition to the above structure, the gaming machine of the present mode further includes a lower front side member (e.g., lower door mechanism DD, and the like) provided below the front side member, wherein the hook is provided in an upper portion side of the front side member, and the front side member is fixed to the exterior member, by having its lower portion pressed against the back surface side by the lower front side member.

This way, the front side member provided with the screen capable of displaying images has its upper portion side fixed to the exterior member by hooking the hook on the protrusion of the exterior member, while its lower portion side is fixed to the exterior member by pressing the lower portion side to the back surface side of the lower front side member. Therefore, even without a provision of a hinge, the front side member provided with the screen is stably fixed to the exterior member, while making the range for displaying images broader.

With the present mode, there is provide a gaming machine in which a broader range for displaying an image is ensured.

[Third Mode]

Further, as in the gaming machine suggested in the Japanese Laid-Open Patent Publication No. 2005-46374, when the image display device is a liquid crystal display device, how the images are seen is determined based on the brightness of the liquid crystal display. Even if the color tone of the image displayed is partially changed, that image is still displayed on the same liquid crystal display, and therefore the change is limited and the effect representation by images is restricted.

In view of the above problems, the present mode is made and it is an object of the present mode to provide a gaming machine capable of providing diverse types of image representation.

The present mode provides gaming machines as follows.

(3-1) A gaming machine of the present mode (e.g., gaming machine 1 and the like) further includes:

a screen (e.g., screen unit 10040, and the like) in which an image displaying part (e.g., screen sheet 10046, and the like) is arranged on a light-transmissive plate (e.g., light-transmissive plate 10045, and the like) made of a light-transmissive plate material, a structure object (e.g., first structure body 10051, and the like) having a light-transmissive material formed in a three-dimensional shape, the structure object disposed in a position close to the screen; and a projector (e.g., projector 10020 and the like) configured to project light for displaying an image on the screen and the structure object, wherein the above structure object has a light diffusion member (e.g., prism sheet 10056, and the like) on the back surface side.

The gaming machine having such a structure includes the screen, the structure object, and the projector. In the screen, the image displaying part is disposed on the light-transmissive plate made of a light-transmissive material. The structure object is made of a light-transmissive material formed in a three-dimensional shape, and is arranged in a position close to the screen. The projector projects light for displaying images on the screen and the structure object. In the structure object is disposed a light diffusion member on the back surface side.

With this, when light from the projector is projected to the screen and the structure object having the light diffusion member, the brightness becomes higher for the image displayed on the structure object having the light diffusion member with a higher light condensing effect than that of the image displaying part of the screen. This differentiates the brightness for the image displayed on the screen and the image displayed on the structure object. As the result, there is provided a gaming machine capable of providing diverse type of image representation.

Further, for example, when the center of the light projected from the projector is directed to the screen, the structure object arranged in a position close to the screen will be subjected to a portion of light distanced from the center. The brightness of the light projected from the projector may drop with an increase in the distance from the center. In such a case however, by arranging the light diffusion member whose light condensing effect is higher than that of the image displaying part in the structure object disposed in a position where the brightness is lower, it is possible to display images with the brightness restrained from decreasing, even in a position distanced from the center of the light projected from the projector.

(3-2) In addition to the above structure, the gaming machine of the present mode further includes
a display controlling unit (e.g., sub CPU 1071, and the like) configured to control the projector,
the display controlling unit performs a control so that the projector emits light to display an image related to a three-dimensional shape of the structure object.

In the gaming machine of such a structure, the display controlling unit controls the projector. The display controlling unit performs the control so that the projector emits light to display an image related to the three-dimensional shape of the structure object.

Thus, the structure object formed in a three-dimensional shape serves as a decoration object of the three-dimensional shape, while no light is projected from the projector, and displays an image related to the three-dimensional shape when light is projected from the projector. This provides an unpredictable effect such that the structure object serving as the decoration object displays an image related to their three-dimensional shapes. As the result, there is provided a gaming machine capable of providing further diverse type of image representation.

(3-3) In addition to the above structure, the gaming machine of the present mode is such that
the screen includes a flat surface portion (e.g., flat surface portion 10041, and the like) which is the light-transmissive plate formed in a flat shape, and a curved portion (e.g., curved portions 10042, and the like) which is curved and which is continuous from a side edge of the flat surface portion.

With this, since the screen is provided with the curved portion, representation of three-dimensional images is also possible on the screen, in addition to the structure object formed in a three-dimensional shape. By combining these, it is possible to display images with different brightnesses from one another. As the result, there is provided a gaming machine capable of providing further diverse type of image representation.

(3-4) In addition to the above structure, the gaming machine of the present mode further includes
an exterior member whose at least front surface side is opened (e.g., cabinet G), wherein
the flat surface portion is arranged on the front surface side of the exterior member, and
the curved portion is curved from the side edge of the flat surface portion towards a front end side of the exterior member.

By arranging the flat surface portion of the screen on the front surface side of the exterior member, and curving the curved portion from the side edge of the flat surface portion towards the front end of the exterior member, it is possible to make representation of images on the screen such that images appear to pop out on the front surface side from the exterior member of the gaming machine. Thus, by combining the three-dimensional image representation on the screen with the image representation on the structure object formed in a three-dimensional shape, it is possible to display images whose brightnesses are different from each other. As the result, there is provided a gaming machine capable of providing further diverse type of image representation.

With the present mode, there is provided a gaming machine capable of providing diverse type of image representation.

[Fourth Mode]

Further, as in a gaming machine suggested in Japanese Laid-Open Patent Publication No. 2005-46374, when the image display device is a liquid crystal display device, the liquid crystal display is flat, and reflection thereon is restrained. Therefore, the liquid crystal display per se has no decorativeness whatsoever, while no images are displayed, and the effect representation is performed only by image displaying, which lacks the surprising characteristics, and the effect representation by images is also limited to those two-dimensional.

In view of the above problems, the present mode is made and it is an object of the present mode to provide a gaming machine capable of providing diverse types of image representation.

The present mode provides gaming machines as follows.

(4-1) A gaming machine of the present mode (e.g., gaming machine 1 and the like) comprises:
a structure object (e.g., third structure body 10053, and the like) having a light-transmissive material formed in a three-dimensional shape; and
a projector (e.g., projector 10020 and the like) configured to project light for displaying an image on the structure object, wherein
the structure object has the image displaying part (e.g., screen sheet 10057, and the like) on the back surface side, and has a half-mirror on the front surface side.

The gaming machine having such a structure includes the structure object and the projector. The structure object is made of a light-transmissive material formed in a three-dimensional shape. The projector projects light for displaying images on the structure object. The structure object has the image displaying part on its back surface side and has a half-mirror on its front surface side.

Thus, the structure object in which the half-mirror is formed in a three-dimensional shape reflects the surrounding scene on the three-dimensional shape, while no light is projected from the projector, and displays an image when light is projected from the projector. This provides an unpredictable effect such that images are displayed on the structure object in a three-dimensional shape which reflects the surrounding scene. As the result, there is provided a gaming machine capable of providing diverse type of image representation.

(4-2) In addition to the above structure, the gaming machine of the present mode further includes
a display controlling unit (e.g., sub CPU 1071, and the like) configured to control the projector, wherein
the display controlling unit performs a control so that the projector emits light to display an image related to a three-dimensional shape of the structure object.

In the gaming machine of such a structure, the display controlling unit controls the projector. The display controlling unit performs the control so that the projector emits light to display an image related to the three-dimensional shape of the structure object.

Thus, the structure object in which the half-mirror is formed in a three-dimensional shape reflects the surrounding scene on the three-dimensional shape, while no light is projected from the projector, and displays an image related to the three-dimensional shape when light is projected from the projector. This provides an unpredictable effect such that the structure object reflecting the surrounding scene display an image related to their three-dimensional shapes. As the result, there is provided a gaming machine capable of providing further diverse type of image representation.

With the present mode, there is provided a gaming machine capable of providing diverse type of image representation.

[Fifth Mode]

Further, as in the gaming machine suggested in Japanese Laid-Open Patent Publication No. 2005-46374, when the image display device is a liquid crystal display device, there are problems that the screen is flat, and the effect representation by images is limited. Further, since the liquid crystal display device is provided inside an exterior member of the gaming machine, the effect representation is confined inside the exterior member, which restricts the effect representation by images.

In view of the above problems, the present mode is made and it is an object of the present mode to provide a gaming machine capable of providing diverse types of image representation.

The present mode provides gaming machines as follows.

(5-1) A gaming machine of the present mode (e.g., gaming machine 1 and the like) includes:
an exterior member whose at least front surface side is opened (e.g., cabinet G);
a screen disposed on a front surface side of the exterior member (e.g., screen unit 10040, and the like); and
a projector (e.g., projector 10020 and the like) configured to project light for displaying an image on the screen, wherein
the screen includes a light-transmissive plate (e.g., light-transmissive plate 10045, and the like) made of a light-transmissive material, and an image displaying part (e.g., screen sheet 10046, and the like) arranged on the light-transmissive plate,
the screen is capable of displaying an image on the front surface side with light projected from the projector and incident on the back surface side of the image displaying part,
the light-transmissive plate is formed closer to the front surface side than the exterior member,
the image displaying part is disposed in a position a predetermined dimension apart from the front end of the exterior member, and
the screen is provided with a gap (e.g., gap S, and the like) of a predetermined width where no image displaying part is disposed, between the image displaying part and the front end of the exterior member.

The gaming machine having such a structure includes the exterior member, the screen, and the projector. The exterior member has at least its front surface side opened. The screen is disposed on the front surface side of the exterior member. The projector projects light for displaying images on the screen. The screen has the light-transmissive plate made of a light-transmissive material, and the image displaying part arranged on the light-transmissive plate. Light projected from the projector is incident on the back surface side of the image displaying part, and the incident light displays an image on the front surface side. The light-transmissive plate is formed close to the front surface side than the exterior member. The image displaying part is disposed in a position a predetermined dimension apart from the front end of the exterior member. As described, the screen is provided with a gap of a predetermined width where no image displaying part is disposed, between the image displaying part and the front end of the exterior member.

Thus, the light-transmissive plate of the screen is formed closer to the front surface side than the exterior member, and the image displaying part is arranged on the light-transmissive plate. This enables displaying of three-dimensional images such that the image pops out from the front surface side of the exterior member. The screen, which is for displaying images on its front surface side with light projected from the projector, is provided with a gap of a predetermined width where no image displaying part is disposed, between the image displaying part and the front end of the exterior member. Therefore images are not displayed in this gap. This makes it possible representation of images such that images appear to be floating at a position apart from the front end of the exterior member. As the result, there is provided a gaming machine capable of providing diverse type of image representation.

(5-2) In addition to the above structure, the gaming machine of the present mode further includes an illumination unit (e.g., indirect illumination unit 10060, and the like) disposed along the gap inside the exterior member.

By arranging the illumination unit in the gap between the front end of the exterior member and the display area (the area in which the image displaying part is arranged), the edge of images on the front end side of the exterior member is emphasized. This makes it possible further emphasized representation of images such that images appear to be floating at a position apart from the front end of the exterior member. As the result, there is provided a gaming machine capable of providing further diverse type of image representation.

With the present mode, there is provided a gaming machine capable of providing diverse type of image representation.

The above described embodiment deals with a case of applying the present invention to a Pachislo gaming machine; however, the present invention is also applicable to other gaming devices (e.g., Pachinko gaming machine, slot machine, and the like).

Embodiments of the present invention thus described above solely serve as specific examples of the present invention, and are not to limit the scope of the present invention. The specific structures and the like are suitably modifiable. Further, structures of the present embodiment are combined in any way provided that such a combination is not contradictory. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

REFERENCE SYMBOL LIST

1: Gaming Machine
1071: Sub CPU
10000: Display Unit
10020: Projector
10040: Screen Unit
10041: Flat Surface Portion
10042: Curved Portion
10043: Side Face Portion
10045: Light-Transmissive Plate
10046: Screen Sheet
10050: Decoration Unit
10050: Decoration Body
10051: First Structure Body
10052: Second Structure Body
10053: Third Structure Bodies
10056: Prism Sheet
10057: Screen Sheet
10060: Indirect Illumination Unit
DD: Lower Door Mechanism
G: Cabinet
Gb: Inner Surface Side Protruding Member
S: Gap
UD: Upper Door Mechanism
UD102: Upper Pressing Member
UD102a: Press Surface
UD102b: Curved Shape Portion
UD120: Hook

What is claimed is:

1. A gaming machine, comprising:
a cabinet having a plurality of walls defining an interior cabinet space;
a display screen comprising at least a portion of one of the plurality of walls of the cabinet and being detachably securable to the cabinet, the display screen including a light transmissive plate having a first curved surface portion and a first image displaying part having a second curved surface portion corresponding to a sub-portion of the first curved surface portion of the light transmissive plate, the light transmissive plate is disposed toward an exterior of the cabinet and the first image displaying part is disposed toward an interior of the cabinet, the light transmissive plate and the first image displaying part in registration with one another such that a visual gap, where no images are displayed on the display screen, is formed between the first image displaying part and a side wall of the cabinet; and
a projector disposed within the interior cabinet space, the projector configured to project projection light toward the display screen,
wherein when the projection light is incident on the display screen including the first image displaying part, the incident light is transmitted toward an exterior side of the display screen such that an image corresponding to the projection light is viewable from the exterior side of the display screen, and
wherein when the projection light is incident on a portion of the display screen not including the first image displaying part and corresponding to the visual gap, no image corresponding to the projection light is viewable from the exterior side of the display screen corresponding to the visual gap.

2. The gaming machine, according to claim 1, wherein the first image displaying part comprises a screen sheet disposed on a back surface side of the light-transmissive plate, and the display screen includes an interposing member having a press surface configured to press the screen sheet against the light-transmissive plate, wherein
the press surface of the interposing member has a curved shape portion whose shape corresponds with a portion of the first curved surface of the light transmissive plate.

3. The gaming machine according to claim 1,
wherein the display screen is detachably removable from a front of the cabinet via a hook and mating protrusion assembly, and
wherein the display screen includes
one of a hook or a protrusion extending therefrom and the cabinet includes a corresponding mating protrusion or hook extending therefrom for receiving the hook or protrusion of the display screen.

4. The gaming machine according to claim 3,
wherein the front of the cabinet includes an upper portion and a lower portion, the one of the hook and the protrusion is provided at an upper side of the display screen and upper portion of the cabinet, and the display screen is secured to the cabinet by having a lower side of the display screen in engagement with the lower portion of the cabinet.

5. The gaming machine according to claim 1, further comprising:
a structure object having a light-transmissive material formed in a three-dimensional shape, the structure object disposed in a position close to the display screen, wherein
the structure object has a light diffusion member disposed on a back surface side thereof.

6. The gaming machine according to claim 1, further comprising:
a structure object having a light-transmissive material formed in a three-dimensional shape, wherein
the projection light is projected on the structure object, and
the structure object has a second image displaying part on a back surface side thereof and has a half-mirror on a front surface side.

7. The gaming machine according to claim 1,
wherein the display screen and the first image displaying part extend from a front side of the cabinet at a distance, and the visual gap has a predetermined dimension.

8. The gaming machine according to claim 7, further comprising an illumination device disposed along the visual gap and inside the cabinet.

9. The gaming machine according to claim 1, further comprising
an imaging device, wherein
the projector executes a process of projecting a first adjustment test image, and a process of measuring a three-dimensional shape of the display screen,
the imaging device executes a process of capturing the first adjustment test image from a first image capturing point which is a second position different from a first position where the projector is installed, thereby obtaining a first adjustment captured image, and
the projector executes a process of image correction to reduce geometrical image deformation at the first image capturing point, based on three-dimensional shape data measured in the process of measuring the three-dimensional shape, and the first adjustment captured image.

10. The gaming machine according to claim 9, wherein the projector executes the process of image correction to further reduce geometrical image deformation, based on a state of an image projected on the display screen, which image has been corrected through the process of correcting image.

11. A gaming machine, comprising:
a cabinet including an openable front side;
a detachably securable display screen forming a portion of the openable front side of the cabinet;
a projector disposed within the cabinet and configured to project projection light toward the display screen;
wherein the display screen includes a light transmissive plate having a first curved surface portion and a first image displaying part having a second curved surface portion corresponding to a sub-portion of the first curved surface portion of the light transmissive plate, the light transmissive plate is disposed toward an exterior of the cabinet and the first image displaying part is disposed toward an interior of the cabinet, the light transmissive plate and the first image displaying part in registration with one another such that a visual gap, where no images are displayed on the display screen, is formed between the first image displaying part and a side wall of the cabinet; and the display screen includes one of a hook or a corresponding protrusion configured to mate with a corresponding protrusion or a corresponding hook of the cabinet, wherein when the projection light is incident on the display screen including the first image displaying part, the incident light is transmitted toward an exterior side of the display screen such that a first image corresponding to the projection light is viewable from the exterior side of the display screen, and wherein when the projection light is incident on a portion of the display screen not including the first image displaying part and corresponding to the visual gap, no first image corresponding to the projection light is viewable from the exterior side of the display screen corresponding to the visual gap.

12. The gaming machine according to claim 11,
wherein the openable front side of the cabinet includes an upper portion and a lower portion,
the one of the hook and the corresponding mating protrusion is provided at an upper side of the display screen and the upper portion of the cabinet, and
the display screen is securable to the cabinet by having a lower side of the display screen in engagement with a lower portion of the cabinet.

13. The gaming machine of claim 11, comprising:
a structure object having a light-transmissive material formed in a three-dimensional shape, the structure object disposed in a position close to the display screen; wherein,
the projection light is projected on the display screen and the structure object, and,
the structure object has a light diffusion member disposed on a back surface side thereof.

14. The gaming machine according to claim 13, further comprising:
a controller configured to control the projector, wherein the controller performs a control so that the projector emits light to display a second image related to the three-dimensional shape of the structure object.

15. The gaming machine according to claim 13, wherein the light transmissive plate has a flat surface portion and the first curved portion is continuous from a side edge of the flat surface portion.

16. The gaming machine according to claim 15, wherein the flat surface portion is arranged on the openable front side of the cabinet, and
the first curved portion extends from the side edge of the flat surface portion and toward a side wall of the cabinet.

17. A gaming machine, comprising:
a cabinet including an openable front side;
a detachably securable display screen forming a portion of the openable front side of the cabinet;
a projector disposed within the cabinet and configured to project projection light toward the display screen and a structure object;
wherein the display screen includes a light transmissive plate having a first curved surface portion and first image displaying part having a second curved surface portion corresponding to a sub-portion of the first curved surface portion of the light transmissive plate, the light transmissive plate is disposed toward an exterior of the cabinet and the first image displaying part is disposed toward an interior of the cabinet, the light transmissive plate and the first image displaying part in registration with one another such that a visual gap, where no images are displayed on the display screen, is formed between the first image displaying part and a side wall of the cabinet, the display screen includes one of a hook or a corresponding protrusion configured to mate with a corresponding protrusion or a corresponding hook of the cabinet, wherein when the projection light is incident on the display screen including the first image displaying part, the incident light is transmitted toward an exterior side of the display screen such that a first image corresponding to the projection light is viewable from the exterior side of the display screen, wherein when the projection light is incident on a portion of the display screen not including the first image displaying part and corresponding to the visual gap, no image corresponding to the projection light is viewable from the exterior side of the display screen corresponding to the visual gap, and wherein the structure object comprises a light-transmissive material formed in a three-dimensional shape and includes a second image displaying part on a back surface side thereof and a half-mirror on a front surface side thereof.

18. The gaming machine according to claim 17, further comprising:
a controller configured to control the projector, wherein the controller performs a control so that the projector emits light to display the second image related to the three-dimensional shape of the structure object.

19. A gaming machine, comprising:
a cabinet including an openable front side;
a detachably securable display screen forming a portion of the openable front side of the cabinet;
a projector disposed within the cabinet and configured to project projection light toward the display screen;
wherein the display screen includes a light transmissive plate having a first curved surface portion and a flat surface portion, as well as a first image displaying part having a second curved surface portion corresponding to at least a sub-portion of the first curved surface portion of the light transmissive plate and a flat surface portion corresponding to the flat surface portion of the light transmissive plate, the light transmissive plate is disposed toward an exterior of the cabinet and the first image displaying part is disposed toward an interior of the cabinet, the light transmissive plate and the first image displaying part in registration with one another such that a visual gap, where no images are displayed on the display screen, is formed between the first image displaying part and a side wall of the cabinet, wherein when the projection light is incident on the display screen including the first image displaying part, the incident light is transmitted toward an exterior side of the display screen such that an image corresponding to the projection light is viewable from the exterior side of the display screen, wherein when the projection light is incident on a portion of the display screen not including the first image displaying part and corresponding to the visual gap, no image corresponding to the projection light is viewable from the exterior side of the display screen corresponding to the visual gap, and wherein the display screen and the first image displaying part extend from a front side of the cabinet at a distance, and the visual gap has a predetermined dimension.

20. The gaming machine according to claim 19, further comprising an illumination device disposed along the visual gap and inside the cabinet.

* * * * *